(12) United States Patent
Menjak et al.

(10) Patent No.: US 7,014,953 B2
(45) Date of Patent: Mar. 21, 2006

(54) REGENERATIVE BIPOLAR FUEL CELL

(75) Inventors: Zdravko Menjak, Troy, MI (US);
Srinivasan Venkatesan, Southfield, MI (US); Boyko Aladjov, Rochester Hills, MI (US); Latchezara M. Gradinarova, Rochester Hills, MI (US); Hong Wang, Troy, MI (US); Standford R. Ovshinsky, Bloomfield Hills, MI (US); Subhash K. Dhar, Bloomfield, MI (US)

(73) Assignee: Texaco Ovoric Fuel Cell, LLC, Rochester Hills, MI (US)

( * ) Notice: Subject to any disclaimer, the term of this patent is extended or adjusted under 35 U.S.C. 154(b) by 444 days.

(21) Appl. No.: 10/277,383

(22) Filed: Oct. 22, 2002

(65) Prior Publication Data
US 2003/0059664 A1    Mar. 27, 2003

Related U.S. Application Data

(63) Continuation-in-part of application No. 10/219,788, filed on Aug. 15, 2002, now Pat. No. 6,835,489, and a continuation-in-part of application No. 09/797,332, filed on Mar. 1, 2001, now Pat. No. 6,620,539.

(51) Int. Cl.
*H01M 4/58* (2006.01)
*H01M 4/86* (2006.01)
*H01M 2/14* (2006.01)
*H01M 10/18* (2006.01)
*H01M 6/48* (2006.01)

(52) U.S. Cl. .................. 429/218.2; 429/27; 429/17; 429/40; 429/34; 429/38; 429/210; 420/900

(58) Field of Classification Search ............. 429/218.2, 429/27, 17, 40, 34, 38, 210; 420/900
See application file for complete search history.

(56) References Cited

U.S. PATENT DOCUMENTS

| 4,430,391 A | 2/1984 | Ovshinsky et al. |
| 4,623,597 A | 11/1986 | Sapru et al. |

(Continued)

*Primary Examiner*—Patrick Joseph Ryan
*Assistant Examiner*—Angela J. Martin
(74) *Attorney, Agent, or Firm*—Frederick W. Mau, II; Marvin S. Siskind

(57) ABSTRACT

The present invention discloses a fuel cell, which incorporates a bipolar plate. The regenerative bipolar fuel cell of the present invention contains at least one hydrogen electrode in contact with a hydrogen stream and at least one oxygen electrode in contact with an oxygen stream. At least one electrolyte chamber is in contact with the hydrogen electrode and at least one electrolyte chamber is in contact with the oxygen electrode. The electrolyte chambers provide mechanical support within the fuel cell and provide an uninterrupted pathway for an electrolyte solution to contact the hydrogen electrode and the oxygen electrode, respectively. At least one bipolar plate is positioned between the hydrogen electrode and the oxygen electrode. The bipolar plate has a hydrogen side in contact with the hydrogen electrode and an oxygen side in contact with the oxygen electrode. The bipolar plate eliminates the need for electrode support frames within a fuel cell and provides an entire electrode in one epoxy frame that ensures the integrity of the different pieces while maintaining the different fluids to be available at the points of their respective reactions. In addition, the bipolar plate acts as a manifold for gas distribution and a gasket for sealing.

13 Claims, 13 Drawing Sheets

U.S. PATENT DOCUMENTS

| | | | |
|---|---|---|---|
| 4,877,508 A * | 10/1989 | Morimoto et al. | 204/290.01 |
| 5,536,591 A | 7/1996 | Fetcenko et al. | |
| 5,851,698 A | 12/1998 | Reichman et al. | |
| 5,856,047 A | 1/1999 | Venkatesan et al. | |
| 5,888,665 A * | 3/1999 | Bugga et al. | 429/40 |
| 6,193,929 B1 | 2/2001 | Ovshinsky et al. | |
| 6,305,442 B1 | 10/2001 | Ovshinsky et al. | |
| 6,447,942 B1 | 9/2002 | Ovshinsky et al. | |
| 6,841,512 B1 * | 1/2005 | Fetcenko et al. | 502/335 |

* cited by examiner

REGENERATIVE BIPOLAR FUEL CELL

RELATED APPLICATION DATA

The application is filed under 37 CFR 1.53 as a continuation-in-part application of application Ser. No. 09/797,332 filed on Mar. 1, 2001 now U.S. Pat. No. 6,620,539 and application Ser. No. 10/219,788 filed on Aug. 15, 2002, now U.S. Pat. No. 6,835,489 both of which are hereby incorporated herein by reference.

FIELD OF THE INVENTION

The present invention generally relates to fuel cells. More particularly, the present invention relates to alkaline fuels cells implementing a bipolar design with an anode, a cathode, an annular space for electrolyte circulation and a common current collector base plate between adjacent cells, thus, eliminating the need for electrode support frames and external electrodes.

BACKGROUND OF THE INVENTION

The present application discloses a bipolar fuel cell that reduces the number of connection points, which reduces the potential risk for flow arrest or slow down. Most conventional alkaline fuel cells are usually designed to be monopolar. More recently, bipolar designs have been investigated with varying degrees of success. There are distinct advantages to both types of designs. The fundamental construction of both designs consists of an anode, a cathode and annular space for electrolyte circulation. The anode and cathode are pressed between a pair of electrically conductive plates which serve as secondary current collectors for collecting the current from the primary current collectors and conducting current between adjacent cells internally of the stack, in the case of bipolar plates and externally of the stack, in the case of monopolar plates at the ends of the stack. The secondary current collecting plates each contain at least one so-called "flow field" that distributes the fuel cell's incoming fluid reactants (e.g., $H_2$ and $O_2$/air) over the surfaces of the anode and cathode. The flow field includes a plurality of lands, which engage the primary current collector and define therebetween a plurality of flow channels through which the gaseous reactants flow. In monopolar systems, there is also a need for an anode gas chamber (for hydrogen) and a cathode gas chamber (for $O_2$/air). When a large number of cells are used, connecting the cells in series and parallel becomes an issue both from an electrical point of view and also the fluids point of view. It is also highly preferable to minimize the connections and the multitudes of tubes going from one cell to another. Every connection is a potential risk for flow arrest or slow down and is also a potential electrolyte leakage spot. Expense also is a factor.

As the world's population expands and its economy increases, the atmospheric concentrations of carbon dioxide are warming the earth causing climate change. However, the global energy system is moving steadily away from the carbon-rich fuels whose combustion produces the harmful gas. Experts say atmospheric levels of carbon dioxide may be double that of the pre-industrial era by the end of the next century, but they also say the levels would be much higher except for a trend toward lower-carbon fuels that has been going on for more than 100 years. Furthermore, fossil fuels cause pollution and are a causative factor in the strategic military struggles between nations. Furthermore, fluctuating energy costs are a source of economic instability worldwide In the United States, it is estimated, that the trend toward lower-carbon fuels combined with greater energy efficiency has, since 1950, reduced by about half the amount of carbon spewed out for each unit of economic production. Thus, the decarbonization of the energy system is the single most important fact to emerge from the last 20 years of analysis of the system. It had been predicted that this evolution will produce a carbon-free energy system by the end of the $21^{st}$ century. The present invention is another product which is essential to shortening that period to a matter of years. In the near term, hydrogen will be used in fuel cells for cars, trucks and industrial plants, just as it already provides power for orbiting spacecraft. But, with the problems of storage and infrastructure solved (see U.S. Pat. No. 6,305,442, entitled "A Hydrogen-based Ecosystem" issued on Oct. 23, 2001 to Ovshinsky, et al., which is hereby incorporated herein by reference and U.S. Pat. No. 6,193,929, entitled "High Storage Capacity Alloys Enabling a Hydrogen-based Ecosystem", issued on Feb. 27, 2001 to Ovshinsky et al., which is hereby incorporated herein by reference), hydrogen will also provide a general carbon-free fuel to cover all fuel needs.

A dramatic shift has now occurred, in which the problems of global warming and climate change are now acknowledged and efforts are being made to solve them. Therefore, it is very encouraging that some of the world's biggest petroleum companies now state that they want to help solve these problems. A number of American utilities vow to find ways to reduce the harm done to the atmosphere by their power plants. DuPont, one of the world's biggest chemicals firm, even declared that it would voluntarily reduce its emissions of greenhouse gases to 35% of their level in 1990 within a decade. The automotive industry, which is a substantial contributor to emissions of greenhouse gases and other pollutants (despite its vehicular specific reductions in emissions), has now realized that change is necessary as evidenced by their electric and hybrid vehicles.

Hydrogen is the "ultimate fuel." In fact, it is considered to be "THE" fuel for the future. Hydrogen is the most plentiful element in the universe (over 95%). Hydrogen can provide an inexhaustible, clean source of energy for our planet, which can be produced by various processes. Utilizing the inventions of subject assignee, the hydrogen can be stored and transported in solid state form in trucks, trains, boats, barges, etc. (see the '810 and '497 applications).

A fuel cell is an energy-conversion device that directly converts the energy of a supplied gas into an electric energy. Researchers have been actively studying fuel cells to utilize the fuel cell's potential high energy-generation efficiency. The base unit of the fuel cell is a cell having a cathode, an anode, and an appropriate electrolyte. Fuel cells have many potential applications such as supplying power for transportation vehicles, replacing steam turbines and power supply applications of all sorts. Despite their seeming simplicity, many problems have prevented the widespread usage of fuel cells.

Presently most of the fuel cell R & D focus is on P.E.M. (Proton Exchange Membrane) fuel cells. The P.E.M. fuel cell suffers from relatively low conversion efficiency and has many other disadvantages. For instance, the electrolyte for the system is acidic based. Thus, noble metal catalysts are the only useful active materials for the electrodes of the system. Unfortunately, not only are the noble metals costly, they are also susceptible to poisoning by many gases, and specifically carbon monoxide (CO). Also, because of the acidic nature of the P.E.M fuel cell, the remainder of the materials of construction of the fuel cell need to be compatible with such an environment, which again adds to the cost thereof. The proton exchange membrane itself is quite expensive, and because of its limited conductivity, inherently limits the power performance and operational temperature range of the P.E.M. fuel cell (the PEM is nearly non-functional at low temperatures, unlike the fuel cell of the instant invention). Also, the membrane is sensitive to high temperatures, and begins to soften at 120° C. The membrane's conductivity depends on water and dries out at higher temperatures, thus causing cell failure. Therefore, there are many disadvantages to the P.E.M. fuel cell, which make it somewhat undesirable for commercial/consumer use.

The conventional alkaline fuel cell has some advantages over P.E.M. fuels cells in that they have higher operating efficiencies, they use less expensive materials of construction, and they have no need for expensive membranes. The alkaline fuel cell also has relatively higher ionic conductivity in the electrolyte, therefore it has a much higher power capability. Unfortunately, conventional alkaline fuel cells still suffer from certain disadvantages. For instance, conventional alkaline fuel cells still use expensive noble metals catalysts in both electrodes, which, as in the P.E.M. fuel cell, are susceptible to gaseous contaminant poisoning. While the conventional alkaline fuel cell is less sensitive to temperature than the PEM fuel cell, the platinum active materials of conventional alkaline fuel cell electrodes become very inefficient at low temperatures.

Fuel cells, like batteries, operate by utilizing electrochemical reactions. Unlike a battery, in which chemical energy is stored within the cell, fuel cells generally are supplied with reactants from outside the cell. Barring failure of the electrodes, as long as the fuel, preferably hydrogen, and oxidant, typically air or oxygen, are supplied and the reaction products are removed, the cell continues to operate.

Fuel cells offer a number of important advantages over internal combustion engine or generator systems. These include relatively high efficiency, environmentally clean operation especially when utilizing hydrogen as a fuel, high reliability, few moving parts, and quiet operation. Fuel cells potentially are more efficient than other conventional power sources based upon the Carnot cycle.

The major components of a typical fuel cell are the hydrogen electrode for hydrogen oxidation and the oxygen electrode for oxygen reduction, both being positioned in a cell containing an electrolyte (such as an alkaline electrolytic solution). Typically, the reactants, such as hydrogen and oxygen, are respectively fed through a porous hydrogen electrode and oxygen electrode and brought into surface contact with the electrolytic solution. The particular materials utilized for the hydrogen electrode and oxygen electrode are important since they must act as efficient catalysts for the reactions taking place.

In an alkaline fuel cell, the reaction at the hydrogen electrode occurs between the hydrogen fuel and hydroxyl ions (OH$^-$) present in the electrolyte, which react to form water and release electrons:

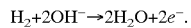

At the oxygen electrode, the oxygen, water, and electrons react in the presence of the oxygen electrode catalyst to reduce the oxygen and form hydroxyl ions (OH$^-$):

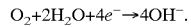

The flow of electrons is utilized to provide electrical energy for a load externally connected to the hydrogen and oxygen electrodes.

The hydrogen electrode catalyst of the alkaline fuel cell splits molecular hydrogen to atomic hydrogen. The electrocatalyst then accelerates the oxidation reaction of the atomic hydrogen to release electrons. The overall reaction can be seen as (where M is the catalyst):

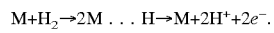

Thus the hydrogen electrode catalyst must efficiently dissociate molecular hydrogen into atomic hydrogen. Using conventional hydrogen electrode material, the dissociated hydrogen atoms are transitional and the hydrogen atoms can easily recombine to form molecular hydrogen if they are not used very quickly in the oxidation reaction. With the hydrogen storage electrode materials of the inventive instant startup fuel cells, the atomic hydrogen is immediately captured and stored in hydride form, and then used as needed to provide power.

In addition to being catalytically efficient on both interfaces, the catalytic material must be resistant to corrosion in the alkaline electrolyte environment. Without such corrosion resistance, the electrodes would quickly lose efficiency and the cell will die.

One prior art fuel cell anode catalyst is platinum. Platinum, despite its good catalytic properties, is not very suitable for wide scale commercial use as a catalyst for fuel cell anodes, because of its very high cost. Also, noble metal catalysts like platinum, cannot withstand contamination by impurities normally contained in the hydrogen fuel stream. These impurities can include carbon monoxide which may be present in hydrogen fuel.

The above contaminants can cause what is commonly referred to as a "poisoning" effect. Poisoning occurs where the catalytically active sites of the material become inactivated by poisonous species invariably contained in the fuel cell. Once the catalytically active sites are inactivated, they are no longer available for acting as catalysts for efficient hydrogen oxidation reaction at the anode. The catalytic sites of the anode therefore is reduced since the overall number of available catalytically active sites is significantly lowered by poisoning. In addition, the decrease in catalytic activity results in increased over-voltage at the anode and hence the cell is much less efficient adding significantly to the operating loss. Over-voltage is the difference between the actual working electrode potential and it's equilibrium value. The physical meaning of over-voltage is the voltage required to overcome the resistance to the passage of current at the surface of the anode (charge transfer resistance). The over-voltage represents an undesirable energy loss, which adds to the operating loss of the fuel cell.

In related work, U.S. Pat. No. 4,623,597 entitled "Rechargeable Battery and Electrode Used Therein" issued Nov. 18, 1986 to Sapru et al. (hereinafter "the '597 patent") and others in it's lineage, which is hereby incorporated herein by reference, one of the present inventors, Stanford R. Ovshinsky, described disordered multi-component hydrogen storage materials for use as negative electrodes in electrochemical cells for the first time. In this patent, Ovshinsky describes how disordered materials can be tailor made (i.e., atomically engineered) to greatly increase hydrogen storage and reversibility characteristics. Such disordered materials are amorphous, microcrystalline, intermediate range order, and/or polycrystalline (lacking long range compositional order) wherein the polycrystalline material includes topological, compositional, translational, and positional modification and disorder. The framework of active materials of these disordered materials consist of a host matrix of one or more elements and modifiers incorporated into this host matrix. The modifiers enhance the disorder of the resulting materials and thus create a greater number and spectrum of catalytically active sites and hydrogen storage sites.

The disordered electrode materials of the '597 patent were formed from lightweight, low cost elements by any number of techniques, which assured formation of primarily non-equilibrium metastable phases resulting in the high energy and power densities and low cost. The resulting low cost, high energy density disordered material allowed the batteries to be utilized most advantageously as secondary batteries, but also as primary batteries.

Tailoring of the local structural and chemical order of the materials of the '597 patent was of great importance to achieve the desired characteristics. The improved characteristics of the anodes of the '597 patent were accomplished by manipulating the local chemical order and hence the local structural order by the incorporation of selected modifier elements into a host matrix to create a desired disordered material. Disorder permits degrees of freedom, both of type and of number, within a material, which are unavailable in conventional materials. These degrees of freedom dramatically change a materials physical, structural, chemical and electronic environment. The disordered material of the '597 patent have desired electronic configurations which result in a large number of active sites. The nature and number of storage sites were designed independently from the catalytically active sites.

Multiorbital modifiers, for example transition elements, provided a greatly increased number of storage sites due to various bonding configurations available, thus resulting in an increase in energy density. The technique of modification especially provides non-equilibrium materials having varying degrees of disorder provided unique bonding configurations, orbital overlap and hence a spectrum of bonding sites. Due to the different degrees of orbital overlap and the disordered structure, an insignificant amount of structural rearrangement occurs during charge/discharge cycles or rest periods there between resulting in long cycle and shelf life.

The improved battery of the '597 patent included electrode materials having tailor-made local chemical environments which were designed to yield high electrochemical charging and discharging efficiency and high electrical charge output. The manipulation of the local chemical environment of the materials was made possible by utilization of a host matrix which could, in accordance with the '597 patent, be chemically modified with other elements to create a greatly increased density of electro-catalytically active sites and hydrogen storage sites.

The disordered materials of the '597 patent were designed to have unusual electronic configurations, which resulted from the varying 3-dimensional interactions of constituent atoms and their various orbitals. The disorder came from compositional, positional and translational relationships of atoms. Selected elements were utilized to further modify the disorder by their interaction with these orbitals so as to create the desired local chemical environments. The internal topology that was generated by these configurations also allowed for selective diffusion of atoms and ions. The invention that was described in the '597 patent made these materials ideal for the specified use since one could independently control the type and number of catalytically active and storage sites. All of the aforementioned properties made not only an important quantitative difference, but qualitatively changed the materials so that unique new materials ensued.

Disorder can be of an atomic nature in the form of compositional or configurational disorder provided throughout the bulk of the material or in numerous regions of the material. The disorder also can be introduced by creating microscopic phases within the material, which mimic the compositional or configurational disorder at the atomic level by virtue of the relationship of one phase to another. For example, disordered materials can be created by introducing microscopic regions of a different kind or kinds of crystalline phases, or by introducing regions of an amorphous phase or phases, or by introducing regions of an amorphous phase or phases in addition to regions of a crystalline phase or phases. The interfaces between these various phases can provide surfaces, which are rich in local chemical environments which provide numerous desirable sites for electrochemical hydrogen storage. These same principles can be applied within a single structural phase. For example, compositional disorder is introduced into the material, which can radically alter the material in a planned manner to achieve improved and unique results, using the Ovshinsky principles of disorder on an atomic or microscopic scale.

The present invention solves problems of current fuel cell designs through the use of bipolar plates in the electrode arrangement, which incorporates internal electrical connections to provide the shortest and more efficient current collection leads. The need for more efficient and economical fuel cells is always present. The present invention helps address these problems by reducing the ohmic losses, eliminating the need for external electrodes and creating an improved connection between plates when electrodes expand.

SUMMARY OF THE INVENTION

The present invention discloses an improved fuel cell. The regenerative bipolar fuel cell of the present invention maintains mechanical support within the fuel cell and may be operated in a wide temperature range (−10° C. to 120° C.), preferably at ambient or near ambient temperatures and pressures. The regenerative bipolar fuel cell of the present invention contains at least one hydrogen electrode in contact with a hydrogen flow and at least one oxygen/air electrode in contact with an oxygen/air flow. At least one electrolyte chamber is in contact with the hydrogen electrode and the oxygen electrode. The electrolyte chamber provides mechanical support within the fuel cell and provide an uninterrupted pathway for an electrolyte solution to contact the hydrogen electrode and the oxygen electrode, respectively. At least one bipolar plate is positioned between the hydrogen electrode and the oxygen electrode. The bipolar plate has a hydrogen side in contact with the hydrogen electrode and an oxygen side in contact with the oxygen electrode. The hydrogen flow may be composed of gaseous hydrogen and the oxygen/air flow may be composed of pure oxygen or air. An electrolyte solution, such as potassium hydroxide, flows through the electrolyte chamber and contacts the hydrogen electrode on one side and the oxygen electrode on the other.

In a preferred embodiment, the hydrogen electrode has a hydrogen contacting surface, an electrolyte solution contacting surface, and a bulk of active anode material. The bulk of anode active material is disposed between the hydrogen contacting surface and the electrolyte contacting surface. Preferably, the hydrogen contacting surface is a gaseous hydrogen contacting surface. Further, the hydrogen contacting surface is designed in such a way to dissociate and adsorb gaseous hydrogen, the bulk of the anode active material is adapted to store the adsorbed hydrogen, and the electrolyte contacting surface is designed to react the stored hydrogen with an electrolyte solution.

The anode active material may be a hydrogen storage alloy, which has excellent catalytic activity for the formation of atomic hydrogen from molecular hydrogen, outstanding catalytic activity toward the reaction of the formation of water from hydrogen ions and hydroxyl ions, and has exceptional corrosion resistance toward the alkaline electrolyte of an alkaline fuel cell. The anode active material is also low cost, containing no noble metals catalysts. The materials are robust and poison resistant. The electrodes are easy to produce, by proven low cost production techniques. The hydrogen electrode of a preferred embodiment eliminates the use of carbon therein, thus helping to reduce the carbonate poisoning of the fuel cell. Such materials are disclosed in commonly owned copending application Ser. No. 09/524,116, filed Mar. 13, 2000, which is hereby incorporated herein by reference.

In a preferred embodiment, the oxygen electrode has an oxygen contacting surface, an electrolyte solution interface, and a bulk of cathode active material. The bulk of cathode active material is disposed between the oxygen interface and the electrolyte interface and the oxygen interface is designed to dissociate and adsorb gaseous oxygen. Further, the bulk of cathode active material is adapted to store the adsorbed oxygen and the electrolyte contacting surface is adapted to react said stored oxygen with an electrolyte solution.

The oxygen electrodes of the present invention may operate through the mechanism of redox reactions, which uniquely provide multiple degrees of freedom in selecting the operating voltages available for such fuel cells. Such oxygen electrodes using the valency change approach provide the fuel cells in which they are used, particularly alkaline fuel cells, with a level of chemical energy storage within the oxygen electrode itself. This means that such fuel cells will have a "buffer" or "charge" available within the oxygen electrode at all times.

In a preferred embodiment, the fuel cell oxygen electrode may comprise a cathode active material capable of reversibly storing energy through the mechanism of a redox couple. The oxygen electrode has a first surface region situated to be exposed to molecular oxygen ($O_2$ or air) which includes a catalytically acting component promoting the absorption of oxygen through the first surface region and into the cathode active material to chemically charge the active material through oxygen absorption.

The fuel cell oxygen electrodes of this invention may utilize redox couples, particularly metal/oxides couples selected from the group of metals consisting of copper, silver, zinc, cobalt and cadmium. Another useful redox couple is the nickel hydroxide/nickel oxyhydroxide couple. Such materials are disclosed and discussed in detail in commonly owned copending application Ser. No. 09/797,332, filed Mar. 1, 2001, which is hereby incorporated herein by reference.

A preferred embodiment of the present invention eliminates the connections for each individual electrode, thereby, reducing the potential ohmic and voltage loss due to the number of connections in a monopolar fuel cell. The bipolar fuel cell of the present invention is applicable to any conventional fuel cell. A preferred embodiment of the present invention provides appropriate gas flow field channels, appropriate electrolyte spacing materials and appropriate sealing methods. Electrolyte and gas feed systems have been incorporated into the bipolar electrodes so that they are available where they are needed. Fluid flows from the inlet of the electrode to the outlet of the electrode to significantly reduce the inter electrode resistance and improve the power generated by the fuel cell.

The present invention may be utilized to provide a regenerative bipolar fuel cell with common current collector base plate between two adjacent electrodes (and correspondingly between two adjacent cells).

The present invention may be utilized to provide a regenerative bipolar fuel cell with gas distributor and "designed in flow field pattern" in the core of the electrodes.

The present invention may be utilized to provide an electrode support from within and on the current collection side.

The present invention may be utilized to provide a fuel cell design that is suitable for both pure oxygen and air. The present invention may be utilized to provide a spacer that keeps the electrolytic chamber dimensions constant.

The present invention may be utilized to provide a bipolar fuel cell with a rubber gasket/epoxy/molded polymer seal between different cells.

The present invention may be utilized to provide a means to distribute the reactant gases uniformly across the face of the electrodes.

The present invention may be utilized to provide a means to circulate the electrolyte within the core of the electrodes so that it is available where it is most needed.

The present invention may be utilized to provide a bipolar fuel cell wherein a stack of fuels cells continue function in the event that a single cell becomes inoperable.

The present invention may be utilized to eliminate the need for electrode support frames within a fuel cell.

The present invention may be utilized to provide an entire electrode pair/pairs in one epoxy frame that ensures the integrity of the different pieces while maintaining the different fluids to be available at the points of their respective reactions.

The present invention may be utilized to provide a bipolar support that acts as a manifold for gas distribution and a gasket for sealing.

DETAILED DESCRIPTION OF THE INVENTION

This invention concerns a bipolar design in a fuel cell, which incorporates parallel flow of hydrogen, oxygen and electrolyte solution throughout the fuel cell while providing the cell with mechanical support. The components of the fuel cell are pressed tightly together to provide mechanical support throughout the fuel cell. While the fuel cell may be compacted together, the fuel cell allows fuel gas (i.e. hydrogen), an oxygen containing steam (i.e. $O_2$ or air), and an electrolyte solution to flow past the electrodes and bipolar plates. In a preferred embodiment, the oxygen/air flows into the fuel cell substantially perpendicular to the flow of fuel gas and electrolyte solution. Gases and liquids flow through the cell via flow channels and porous structures. The fuel cell also allows for expansion of the electrodes by using layers designed to absorb the expansion of the electrodes in the Z direction as the electrodes absorb hydrogen. This helps prevent distortion of the electrodes through bowing and expansion of the electrodes due to absorption and desorption of hydrogen. The hydrogen, oxygen, and electrolyte solution, such as an aqueous alkaline solution, flow parallel to the respective electrodes throughout the fuel cell. To allow the oxygen and hydrogen to uniformly contact the respective electrodes and bipolar plate, both the electrodes and bipolar plate utilize flow channels to move the oxygen and hydrogen across their faces. This helps promote efficiency within the fuel cell due to a higher percentage of the oxygen and hydrogen being in direct contact with the electrodes and bipolar plate. The flow channels also allow the oxygen and hydrogen to contact the electrodes and bipolar plate despite the compacted design of the fuel cell. The electrodes are separated by porous chambers through which the electrolyte solution flows. The design of the chambers allow the electrolyte to flow through the fuel cell and contact the electrodes and bipolar plate while maintaining mechanical support throughout the fuel cell.

Figure 1:
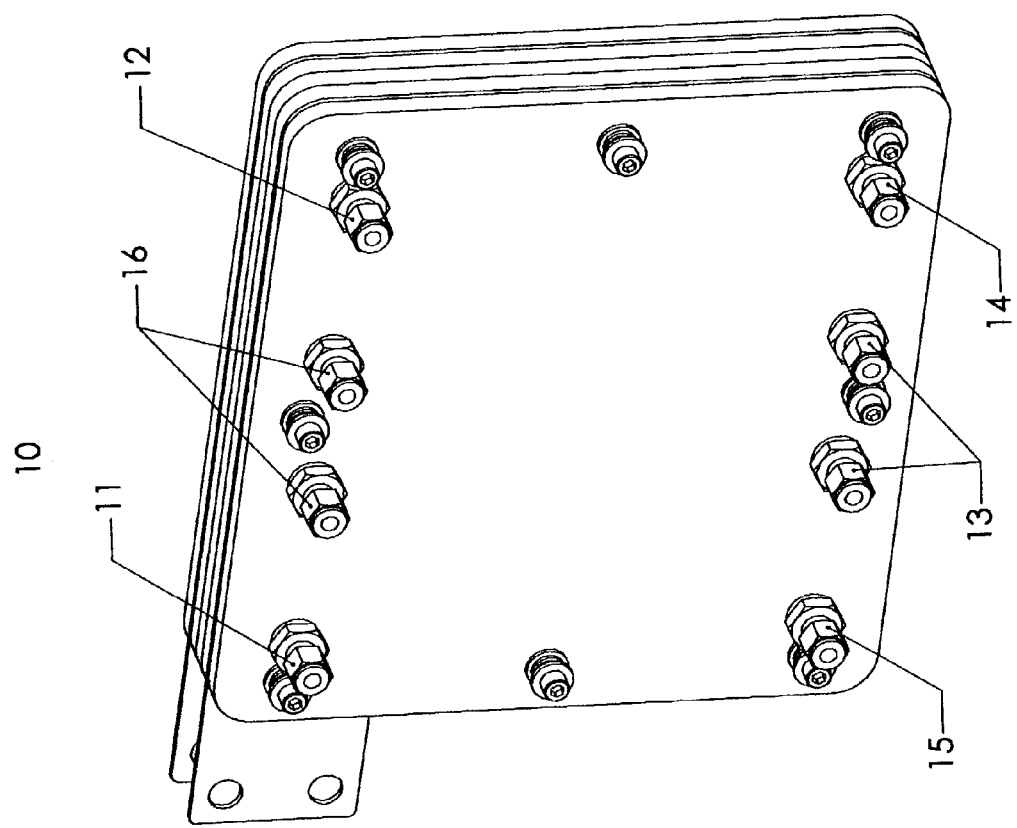
FIG. 1 illustrates the regenerative bipolar fuel cell of the present invention.

A preferred embodiment of the fuel cell 10 of the present invention is shown in FIG. 1. Each of the layers of the fuel cell 10 has multiple holes through which oxygen, hydrogen, and electrolyte solution flow. When the layers are stacked and pressed together, the holes of each layer line up to allow uninterrupted flow throughout the cell. The fuel cell has a hydrogen inlet 11, an oxygen inlet 12, an electrolyte inlet 13, a hydrogen outlet 14, an oxygen outlet 15, and an electrolyte outlet 16. The hydrogen flows into the fuel cell 10 through the hydrogen inlet 11 to the hydrogen electrode. The hydrogen electrode is configured to allow the hydrogen to enter the hydrogen electrode and flow between the hydrogen electrode and the hydrogen side of the bipolar plate. Hydrogen is absorbed by the hydrogen electrode and the excess hydrogen flows out of the fuel cell through the hydrogen outlet 14. The excess hydrogen may be used to help remove generated heat from the fuel cell. Oxygen or an oxygen containing mixture, such as air, flows into the fuel cell through the oxygen inlet 12 to the oxygen electrode. The oxygen electrode is configured to allow the oxygen to enter the oxygen electrode and flow between the oxygen electrode and the oxygen side of the bipolar plate. The oxygen is then consumed by the oxygen electrode. The excess oxygen then exits the fuel cell through the oxygen outlet 15. An oxygen outlet 15 may not be needed when a pure oxygen stream is used as the oxygen source. When air is used as the oxygen source, the oxygen between the oxygen electrode and the oxygen side of the bipolar plate is absorbed from the air. The remaining nitrogen and carbon dioxide left from the air stream flow out of the fuel cell 10 through the oxygen outlet 15. The electrolyte solution flows into the fuel cell 10 through the electrolyte inlets 13 to the electrolyte chambers. The electrolyte solution then flows through the electrolyte chambers and contacts the hydrogen and oxygen electrodes on the appropriate side. After the electrolyte solution flows past the electrodes, the electrolyte solution then flows out of the fuel cell 10 through the electrolyte outlets 16.

Figure 2:
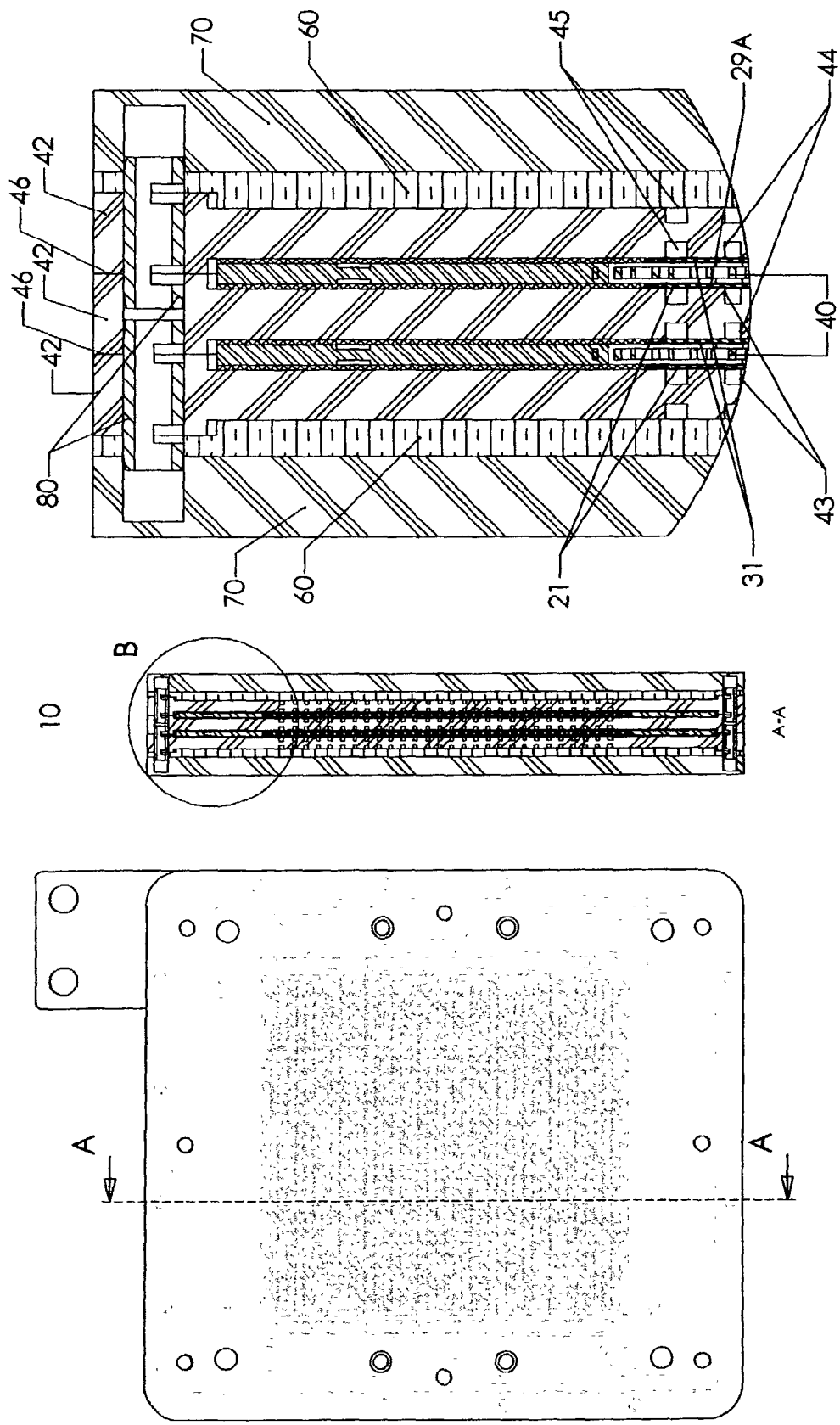
FIG. 2 illustrates a magnified cross sectional view of the regenerative bipolar fuel cell of the present invention along line A—A.
Figure 3:
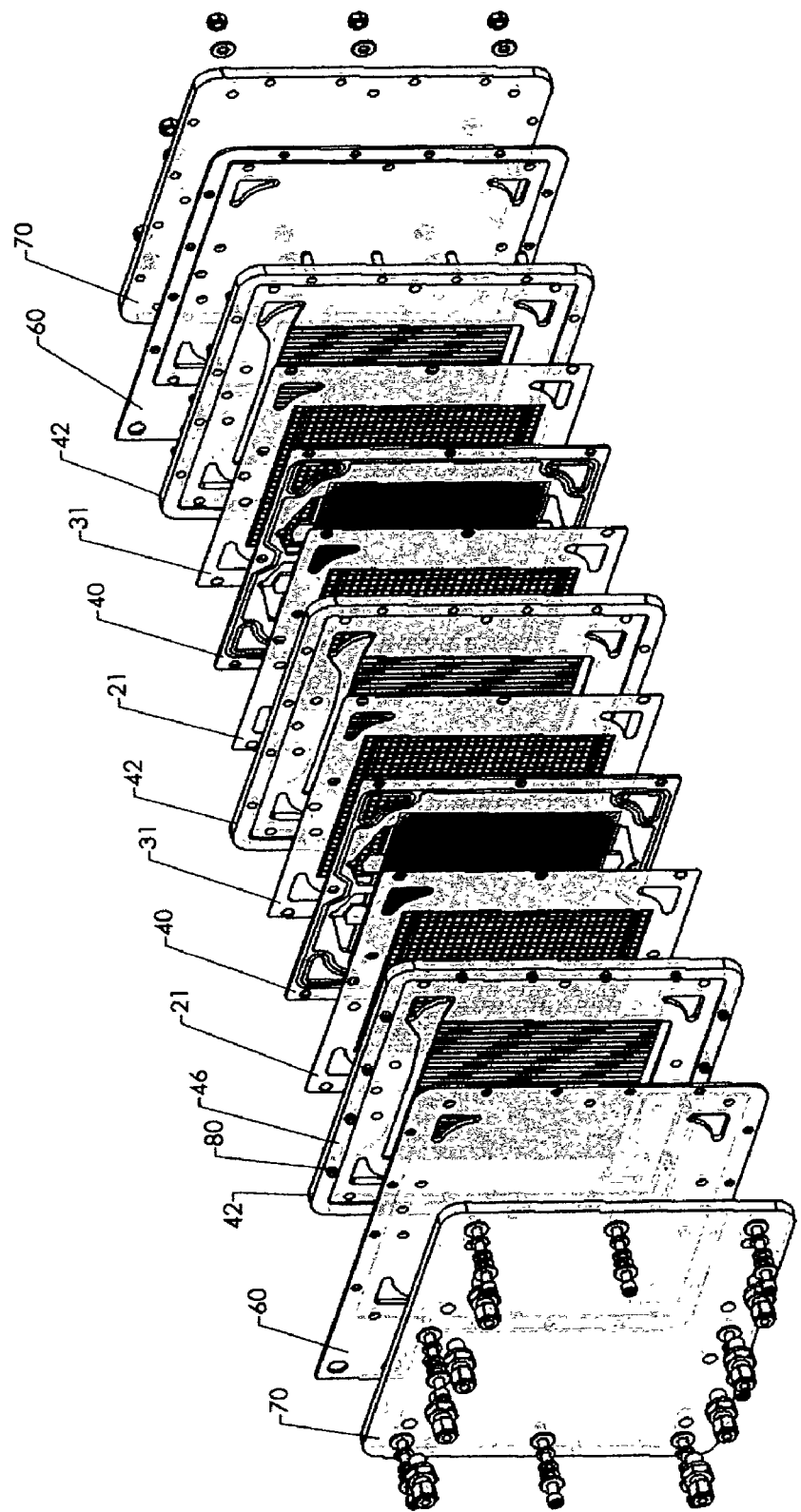
FIG. 3 illustrates an exploded view of the regenerative bipolar fuel cell of the present invention.

As shown in FIGS. 2 and 3, the fuel cell has a stack formation, preferably with multiple layers. The fuel cell 10 contains at least one hydrogen electrode 21 disposed between an electrolyte chamber 40 and the hydrogen side 43 of a bipolar plate 42. The fuel cell 10 contains at least one oxygen electrode 31 disposed between the electrolyte chamber 40 and the oxygen side 44 of another bipolar plate 42. Big end plates 70 are placed on the outside of the current collectors 60 to complete the stack. The big end plates 70 are bolted together and provide mechanical support and compression to the fuel cell 10.

As shown in FIGS. 2 and 3, the fuel cell has a stack formation with multiple layers. The fuel cell 10 preferably contains at least two hydrogen electrodes 21. The first hydrogen electrode 21 is disposed between an electrolyte chamber 40 and the hydrogen side 43 of a bipolar plate 42. The second hydrogen electrode 21 is disposed between a second electrolyte chamber 40 and the hydrogen side 43 a second bipolar plate 42. The fuel cell 10 preferably contains at least two oxygen electrodes 31. The first oxygen electrode 31 is disposed between the first electrolyte chamber 40 and the oxygen side 43 of the second bipolar plate 42. The second oxygen electrode 31 is disposed between the first electrolyte chamber 40 and the oxygen side 43 of a third bipolar plate 42. Current collectors 60 are placed outside the first and third bipolar plates 42. Big end plates 70 are placed on the outside of the current collectors 60 to complete the stack. The big end plates 70 are bolted together and provide mechanical support and compression to the fuel cell 10.

It should be noted that FIGS. 2 and 3 illustrate an embodiment with two hydrogen electrodes 21, two oxygen electrodes 31, two electrolyte chambers 40, three bipolar plates 42, two current collectors 60 and two end plates 70. The fuel cell is easily expandable by the addition of more layers as dictated by design requirements. In such case additional hydrogen electrodes, oxygen electrodes, electrolyte chambers, and bipolar plates may be added. However, the layers must be positioned as earlier described and illustrated with respect to one another for operation of the fuel cell 10.

Figure 4:
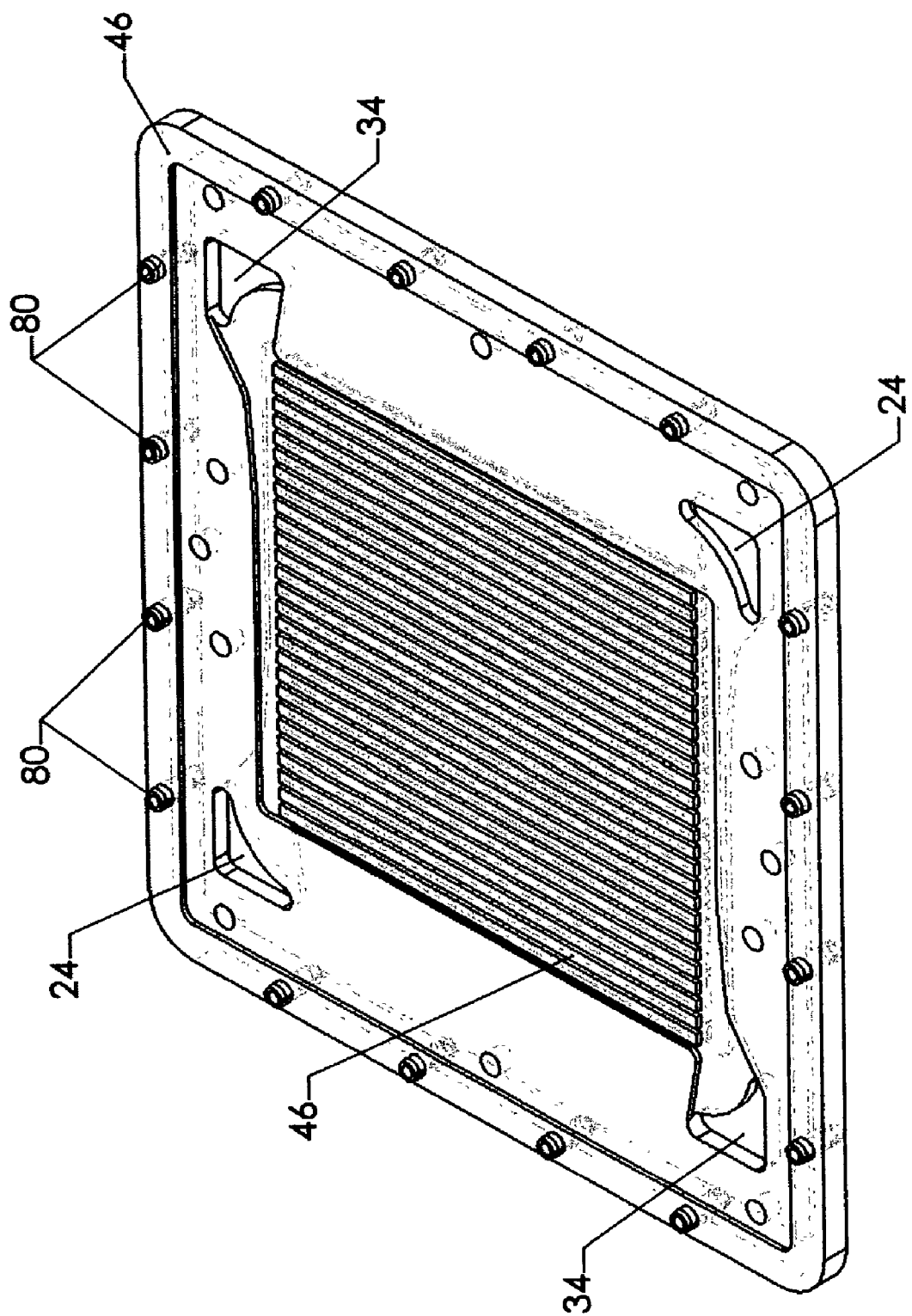
FIG. 4 illustrates a detailed view of a bipolar plate of the present invention.

A hydrogen side 43 of the bipolar plate 42 may serve as an anode for one cell and an oxygen side 44 of the bipolar plate 42 may serve as the cathode for the adjacent cell, as illustrated in FIG. 2. Interelectrode connections 46 are accomplished via the bipolar plate 42, which provides short and efficient current collection leads. As illustrated in FIG. 4, the flow channels 45 of the bipolar plate 42 are designed to maximize the contact surface area to provide the maximum reaction surface, improve electrical contact and better conductivity, which reduces energy losses due to ohmic resistance. This helps promote efficiency within the fuel cell 10 due to a higher percentage of the oxygen and hydrogen being in direct contact with the appropriate side of the bipolar plate 42. The flow channels 45 ensure that the respective gases are available at all points of the reaction. The flow channels 45 also allow the oxygen and hydrogen to contact the bipolar plate 42 despite the compacted design of the fuel cell. To accomplish this, the bipolar plate 42 may have a plurality of flow channels 45 depressed into the hydrogen side 43 and the oxygen side 44. The flow channels 45 may extend vertically and horizontally across the hydrogen side 43 and the oxygen side 44. In a preferred embodiment, the hydrogen contacting surface of the hydrogen electrode 21 is adjacently disposed to the hydrogen side 43 of the bipolar plate 42 and the plurality of channels line 45 up to form a series of hydrogen flow channels between the hydrogen side 43 of the bipolar plate 42 and the hydrogen contacting surface of the hydrogen electrode 21. In another embodiment, obstructions may be set in the flow channels 45 to increase or decrease pressure depending on the needs for a given system. For example, the flow channels 45 may be narrowed or enlarged at various points or a barrier could be set in one or more of the flow channels 45 to require a higher flow pressure to overcome the barrier.

The preferred construction material of the bipolar plate 42 is nickel (Ni). However, some conductive plastics may be used under appropriate conditions, where temperature allows the conductive plastic to maintain the necessary integrity. The conductive plastics of this embodiment are constructed of plastics with a conductive agent such as carbon graphite or copper. The conductive agent may also be an inherently conducting plastic, such as modified polyaniline or modified polypyrrole. The plastic element may be selected from groups such as, but not limited to polyacetylenes, polypyrroles and plastics incorporating an azide group.

Referring to FIG. 2, the bipolar plate 42 enables the fuel cell to utilize internal electrode connections 46 for conducting current between adjacent cells internally of the stack rather than the external electrodes utilized in a monopolar system. The bipolar plate 42 eliminates the need for electrode support frames within a fuel cell and provides an entire electrode in one epoxy frame that ensures the integrity of the different pieces while maintaining the different fluids to be available at the points of their respective reactions. In addition, the bipolar plate acts as a manifold for gas distribution and a gasket for sealing. Elastic pins 80 may be set into the bipolar plates 42 to inshore the correct position of bipolar plates 42 and additionally inshore conductive current between two bipolar plates 42 laterally pressing on to faced bipolar plates, as illustrated in FIGS. 2 through 4.

Figure 13:
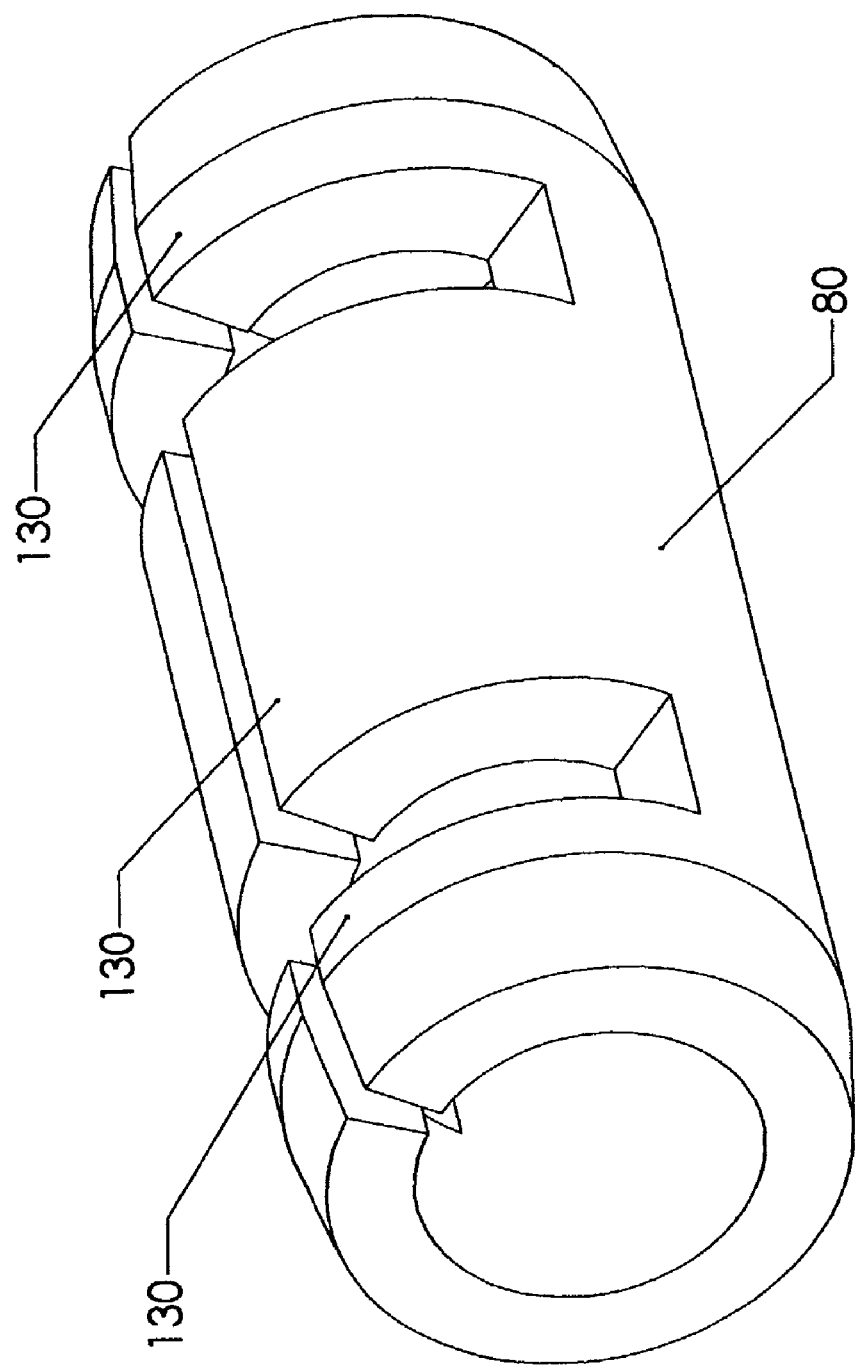
FIG. 13 is angled side view of an embodiment of the elastic pin of the present invention.

Referring to FIG. 13, the elastic pin 80 of a preferred embodiment of the present invention is illustrated. The elastic pin 80 preferably has an elongated tubular C-shape. The diameter of the elastic pin 80 is greater than the diameter of the pin holes of the bipolar plates 42. Each bipolar plate 42 may be fabricated with several pin holes. The elastic pin 80 is compressed at the opening of the C-shape and inserted into the pin holes. Once inserted into a pin hole, the elastic pin 80 expands to press against the interior side of the pin hole to insure maximum contact with the interior side. Preferably, at least one end of the elastic pin 80 is tapered for ease of insertion into the pin hole. The elastic pin 80 provides stability within the fuel cell by locking the bipolar plates 42 into position. Additionally, the elastic pin 80 acts as a bridge to improve electrical conductivity between the bipolar plates 42. Referring to FIGS. 2 through 4 and 13, the elastic pin 80 is preferably slotted and the respective slots are positioned over the connection points 46 between the bipolar plates 42. The elastic pin 80 is preferably radially slotted to create discreet zones 130 in the elastic pin 80 that may conform to different diameters within the pin holes of the bipolar plates 42. When multiple bipolar plates 42 are utilized, the pin holes may have different diameters that result from human or machine error. By creating discreet zones 130 in the elastic pin 80, each zone 130 may conform to a different diameter as it expands. This expansion allows each zone 130 to maintain maximum electrical contact within the pin holes of each bipolar plate 42 in the fuel cell 10 stack. This improves electrical contact by creating addition bridges that capture electrical current that may be lost due to poor contact.

Preferably, the elastic pin 80 is fabricated from an elastic conductive material that may compress and expand as described above, such as nickel, steel or copper. However, due to the possibility of electrolyte leakage, the material is preferably resistant to corrosion from the electrolyte. Therefore, nickel is the preferred material.

Figure 5:
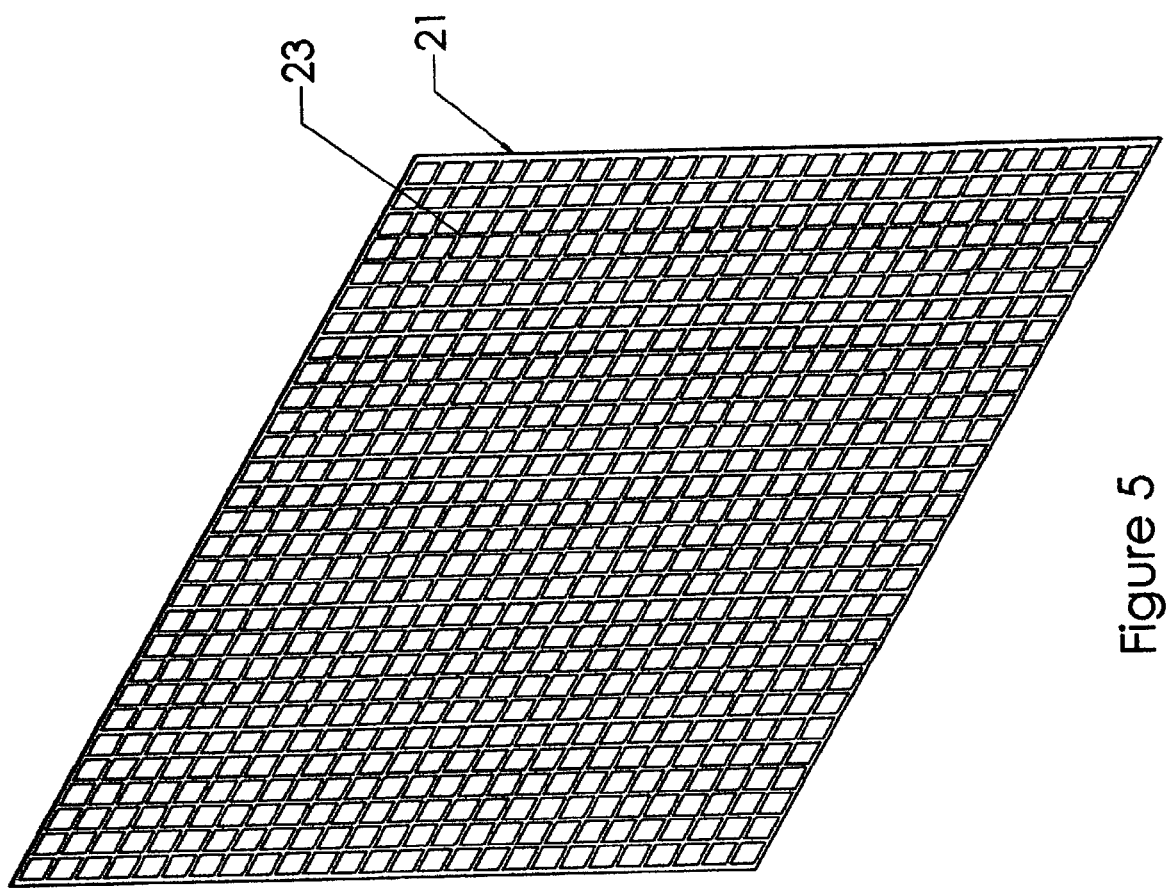
FIG. 5 illustrates a detailed view of a hydrogen electrode in accordance with the present invention.

Referring to FIG. 5, the hydrogen electrode may have a single deep channel 23 running vertically along two opposite edges of the hydrogen electrode 21. The deep channel may have a conductive backing. The conductive backing may be composed of nickel or another conductive metal, such as nickel plated copper or nickel plated steel. The conductive backing may be electrically connected to the anode active material within the electrode (possibly via the conductive support). The conductive backing aids the fuel cell in current collection. When the hydrogen electrode 21 is pressed together with the hydrogen side 43 of the bipolar plate 42, the deep channels 23 line up between the hydrogen electrode 21 and the hydrogen side 43 of the bipolar plate 42, thereby forming manifolds with both edges extending vertically. The holes 24 in each deep channel 23 thereby form a hydrogen inlet and outlet the hydrogen electrode 21. Hydrogen enters the hydrogen electrode 21 through the hole at the top of the hydrogen electrode and exits through the hole at the bottom of the hydrogen electrode. Hydrogen is thereby evenly distributed to the flow channels 23 and across the hydrogen electrode 21 and bipolar plate 42 by the manifolds.

Figure 6:
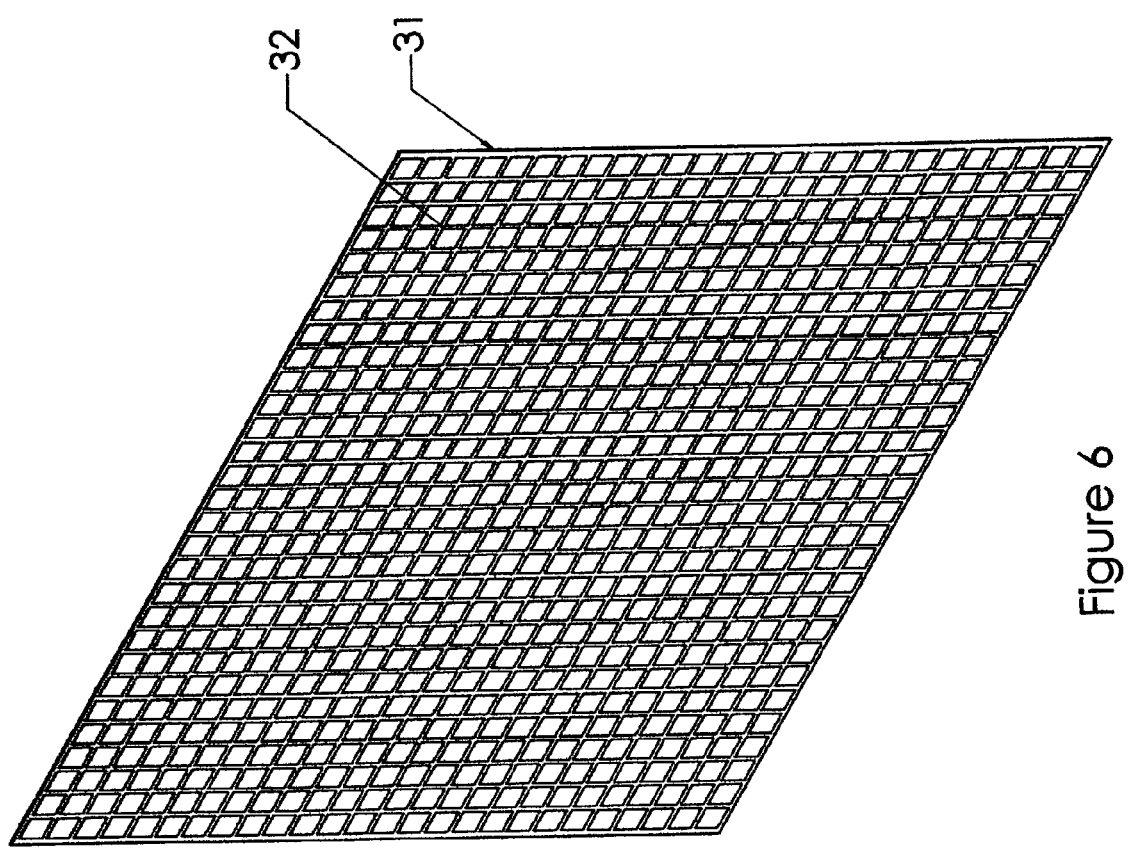
FIG. 6 illustrates a detailed view of an oxygen electrode in accordance with the present invention.

Each fuel cell 10 also contains at least one oxygen electrode 31, as illustrated in FIG. 6. The oxygen electrode 31 is pressed to create uniform contact between the oxygen electrode 31 and the oxygen side 44 of the bipolar plate 42, illustrated in FIGS. 2 and 4, thereby promoting optimum absorption of oxygen into the oxygen electrode 31. The oxygen electrode 31 is substantially rectangular in shape. The oxygen electrode 31 has a plurality of channels 32 on the oxygen contacting surface of the oxygen electrode 31. The channels 32 may have a wave shape and run horizontally across the oxygen contacting surface 31. When the oxygen electrode 31 is pressed together with the oxygen side 44 of the bipolar plate 42, the channels 32 line up and form a series wave shaped flow channels disposed between the oxygen electrode 31 and the bipolar plate 42. Other channel designs may be used provided that the channels line up to form flow channels when the oxygen electrode 31 and the bipolar plate 42 are pressed together. Oxygen then flows through the flow channels and is readily absorbed into the oxygen electrode 31. The design of these flow channels allow for substantial oxygen flow parallel to the oxygen electrode 31 while mechanical support is maintained within the fuel cell 10. The design also allows for uniformity throughout each oxygen electrode 31. The workload of each oxygen electrode 31 is thereby optimized.

Porous sheets may also be used instead of the flow channels. In such case, the porous sheet will be placed between the oxygen electrode and the oxygen side 44 of the bipolar plate 42. This allows oxygen to flow across the oxygen electrodes. Preferably, the porous sheets are comprised of an expanded polyolefin material or extruded biplanar netting, however other materials may be used provided they are able to withstand the environment within the fuel cell 10.

The oxygen electrode 31 also has a single deep channel 33 running vertically along the edges of the oxygen electrode 31. The deep channels may have a conductive backing. The conductive backing may be composed of nickel or another conductive metal, such as nickel plated copper or nickel plated steel. The conductive backing may be electrically connected to the cathode active material within the electrode. The conductive backing aids the fuel cell in current collection. In a preferred embodiment, one deep channel 33 is at its widest point at the bottom of the oxygen electrode 31 and at its narrowest point at the top of the oxygen electrode 31 and the other channel is at its widest point at the top of the oxygen electrode 31 and at its narrowest point at the bottom of the oxygen electrode 31. At the wide points of each deep channel 33, a hole 34 is placed in the oxygen electrodes 31. When the oxygen electrode and the bipolar plate are pressed together, the channels line up and form manifolds on two opposite edges of the oxygen electrode 31 extending vertically along the oxygen electrode 31. The holes 34 in each deep channel 33 thereby form oxygen inlets and outlets for the oxygen electrode 31. Oxygen enters the oxygen electrode 31 through the hole at the top of the electrode and exits through the hole at the bottom of the electrode. Oxygen is thereby evenly distributed to the flow channels across each oxygen electrode 31 and the bipolar plate 42 through the manifolds.

Figure 7:
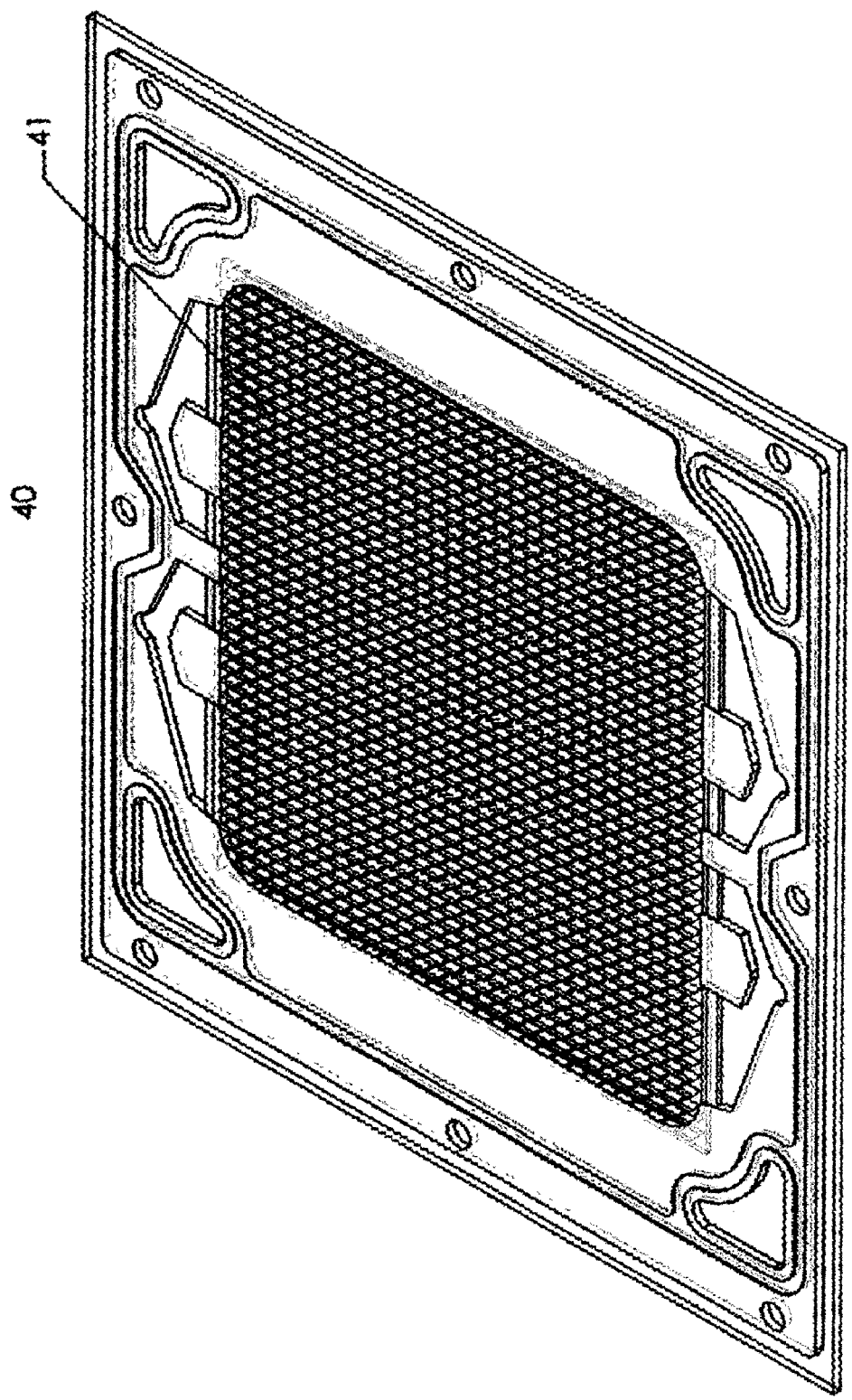
FIG. 7 illustrates a detailed view of the electrolyte chamber in accordance with the present invention.

Electrolyte chambers may be used to maintain mechanical support within the fuel cell 10 while providing a pathway for the electrolyte solution flow throughout the fuel cell 10. A more detailed view of an electrolyte chamber 40 in accordance with the present invention is shown in FIG. 7. The electrolyte chambers 40 allow the electrolyte solution to contact the hydrogen electrodes and the oxygen electrodes. The electrolyte chambers 40 may be composed of an expanded polyolefin sheet 41 having a thin membrane on each side. The membrane helps prevent excess electrolyte from contacting the electrode and also prevents hydrogen or oxygen from penetrating into the electrolyte solution. The electrolyte chambers 40 may also be shared between electrodes in expanded designs, as illustrated in FIG. 2. The electrolyte chambers may be in direct contact with the electrodes. The electrolyte solution enters the fuel cell 10 and flows through the electrolyte chamber 40. After passing through the electrolyte chamber 40, the electrolyte solution flows out of the fuel cell 10. While the electrolyte chamber is preferably constructed from an expanded polyolefin sheet, any porous material that allows unrestricted flow throughout its structure while maintaining mechanical support of the fuel cell may be substituted. The porous material must also be one that does not react with the alkaline electrolyte solution and must be able to withstand the operating temperatures of the fuel cell 10.

Rubber compression plates may be inserted into the fuel cell 10 to absorb volumetric expansion of the fuel cell 10 and help maintain mechanical support of the fuel cell stack. The rubber compression plates are located between the end plates 70 and the outside current collectors 60, however more rubber compression plates may be added to comply with design requirements. The rubber compression plates are designed to absorb expansion of the electrodes in the Z direction as the electrodes expand and contract as hydrogen is absorbed and desorbed by the electrode. The rubber compression plates may be constructed from any rubber type material, however the rubber material must not be reactive with the alkaline electrolyte solution and must be able to withstand the operating temperatures of the fuel cell 10.

The hydrogen electrodes may be generally composed of an anode active material having hydrogen storage capacity. The anode active material is designed to have a high density of active catalytic sites, resistance to poisoning, and long operating life to provide efficient low cost fuel cell operation. In a preferred embodiment, the hydrogen electrode has a hydrogen contacting surface, an electrolyte solution contacting surface, and a bulk of active anode material. The bulk of anode active material is disposed between the hydrogen contacting surface and the electrolyte contacting surface. Preferably, the hydrogen contacting surface is a gaseous hydrogen contacting surface. Further, the hydrogen contacting surface is adapted to adsorb and absorb hydrogen, the bulk of the anode active material is adapted to store the adsorbed hydrogen, and the electrolyte contacting surface is adapted to react said stored hydrogen with an electrolyte solution.

An anode active material of the instant invention may be a composite of a hydrogen storage material and an additional catalytic material. The preferable anode active material is one which can reversibly absorb and release hydrogen irrespective of the hydrogen storage capacity and has the properties of a fast hydriding reaction rate, a good stability in the electrolyte and a long shelf-life. It should be noted that, by hydrogen storage capacity, it is meant that the material stores hydrogen in a stable form, in some nonzero amount higher than trace amounts. Preferred materials will store about 0.1 weight % hydrogen or more. Preferably, the alloys include, for example, rare-earth/Misch metal alloys, Raney nickel, zirconium and/or titanium alloys or mixtures thereof. The anode active material may even be layered such that the material on the hydrogen contacting surface is formed from a material which has been specifically designed to be highly catalytic to the dissociation of molecular hydrogen into atomic hydrogen, while the material on electrolyte contacting surface is designed to be highly catalytic to the formation of water from hydrogen and hydroxyl ions. Such materials are disclosed in commonly owned U.S. Pat. No. 6,447,942 issued to Ovshinsky et al. on Sep. 10, 2002, which is hereby incorporated herein by reference.

Certain hydrogen storage materials are exceptionally useful as alkaline fuel cell anode materials. The useful hydrogen storage alloys have excellent catalytic activity for the formation of hydrogen ions from molecular hydrogen and also have superior catalytic activity toward the formation of water from hydrogen ions and hydroxyl ions. In addition to having exceptional catalytic capabilities, the materials also have outstanding corrosion resistance toward the alkaline electrolyte of the fuel cell. In use, the alloy materials act as 1) a molecular hydrogen decomposition catalyst throughout the bulk of the hydrogen electrode; and 2) as an internal hydrogen storage buffer to insure that a ready supply of hydrogen atoms is always available at the electrolyte contacting surface.

Specific alloys useful as the anode active material are alloys that contain enriched catalytic nickel regions of 50–70 Angstroms in diameter distributed throughout the oxide interface which vary in proximity from 2–300 Angstroms preferably 50–100 Angstroms, from region to region. As a result of these nickel regions, the materials exhibit significant catalysis and conductivity. The densities of Ni regions in the alloys provide powder particles having an enriched Ni surface. The most preferred alloys having enriched Ni regions are alloys having the following composition:

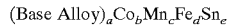

wherein the Base Alloy comprises 0.1 to 60 atomic percent Ti, 0.1 to 40 atomic percent Zr, 0 to 60 atomic percent V, 0.1 to 57 atomic percent Ni, and 0 to 56 atomic percent Cr; b is 0 to 7.5 atomic percent; c is 13 to 17 atomic percent; d is 0 to 3.5 atomic percent; e is 0 to 1.5 atomic percent; and a+b+c+d+e=100 atomic percent. Such materials are disclosed in U.S. Pat. No. 5,536,591 entitled "Electrochemical Hydrogen Storage Alloys for Nickel Metal Hydride Batteries" issued Jul. 16, 1996 to Fetcenko et al., which is hereby incorporated herein by reference.

Figure 8:
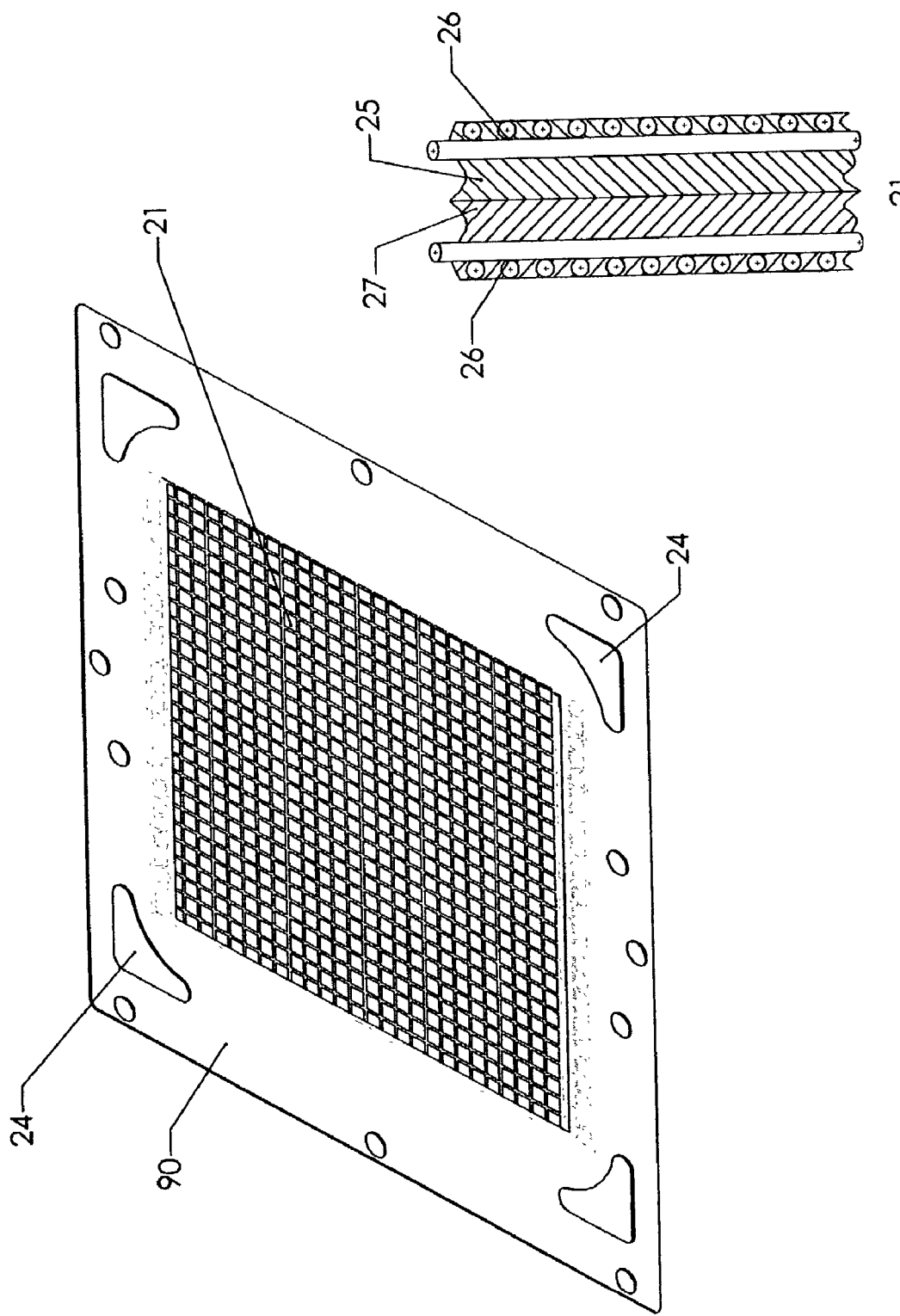
FIG. 8 illustrates a cross sectional view of the preferred embodiment of the anode in accordance with the present invention.

The hydrogen electrodes in the preferred embodiment of the present invention have a layered structure and are shown in FIG. 8. The layered structure promotes hydrogen dissociation and absorption within the hydrogen electrode 21. Each hydrogen electrode 21 is composed of an active material layer 25, a current collector grid 26, and a porous polytetrafluoroethylene layer 27. The active material layer 25 is disposed between the current collector grid 26 and the polytetrafluoroethylene enriched layer 27. The active material layer 25 may be dispersed throughout the current collector grid 26. Examples of current collector grids include, but are not limited to, mesh, grid, matte, expanded metal, foil, foam and plate. The current collector 26 grid may be composed of a conductive material such as nickel. Other conductive materials may be substituted as required by design constraints. The polytetrafluoroethylene layer 27 may be approximately 0.0007 inches thick. The current collector grid 26 is on the electrolyte contacting side of the hydrogen electrode 21 and the polytetrafluoroethylene layer 27 is on the opposing side in contact with the hydrogen side 43 of the bipolar plate 42. The hydrogen electrode may be overmolded with rubber, ethylene propylene diene monomer (EPDM) or other elastic sealer 90.

The active material layer 25 may be composed of Misch metal nickel alloy, Raney nickel, graphite, and polytetrafluoroethylene powder. A preferred composition of the active material layer 25 is by weight 39% Mischmetal nickel alloy, 49% Raney nickel, 4% graphite, and 8% polytetrafluoroethylene. The most preferred Misch metal nickel alloy has the following composition by weight percent:

50.07% Ni, 10.62% Co, 4.6% Mn, 1.8% Al, 20.92% La, 8.63% Ce, 0.87% Pr, and 2.49% Nd. The graphite may be one with isotropic shape having high electrical and thermal conductivity. A typical example of such graphite is called TIMREX® KS-75 (Trademark of Timcal Group). Raney nickel and polytetrafluoroethylene are well known in the art and do not need any further discussion.

In a preferred embodiment, the substrate component may act as both an electrical conductor and a support structure. The electrode may be formed by pressing active material into a porous metal substrate. The conductivity of the electrode can be increased by increasing the conductivity of the electrode's porous metal substrate. Generally the porous metal substrate includes, but is not limited to, meshes, grid, matte, foil, foam, plate, and expanded metal. Preferably, the porous metal substrate used for the electrode is a mesh, grid, foam, or expanded metal. The substrate may be formed from any material, which is electrically conductive and resistant to corrosion or chemical attack, by the electrolyte. Nickel or nickel alloy is a very good material, but for high power applications it may be too resistive. Thus when high power is required, the substrate is formed from copper, copper-plated nickel, or a copper-nickel alloy, as taught by U.S. Pat. No. 5,856,047 entitled "High Power Nickel-Metal Hydride Batteries and High Power Electrodes for Use Therein" issued Jan. 5, 1999 to Venkatesan, et al. and U.S. Pat. No. 5,851,698 entitled "Nickel-Metal Hydride Batteries Having High Power Electrodes and Low-Resistance Electrode Connections" issued on Dec. 22, 1998 to Reichman et al., both of which are incorporated herein by reference. As used herein, "copper" refers to either pure copper or an alloy of copper, and "nickel" refers to either pure nickel or an alloy of nickel. Using copper to form the porous metal substrate of the electrode has several important advantages. Copper is an excellent electrical conductor. Hence, its use as a substrate material decreases the resistance of the anode. This decreases the amount of fuel cell power wasted due to internal dissipation, and thereby provides a fuel cell having increased output power. Copper is also a malleable metal. Increased substrate malleability allows the substrate to more reliably hold the active hydrogen storage material that is compressed onto the substrate surface. This lessens the need to sinter the electrode after the active material has been compressed onto the substrate, thereby simplifying and reducing the cost of the anode manufacturing process.

The oxygen electrode may contain an active material component, which is catalytic to the dissociation of molecular oxygen into atomic oxygen, catalytic to the formation of hydroxyl ions (OH-) from water and oxygen, corrosion resistant to the electrolyte, and resistant to poisoning. A material useful as an active material in the oxygen electrode is on a host matrix including at least one transition metal element, which is structurally modified by the incorporation of at least one modifier element to enhance its catalytic properties. Such materials are disclosed in U.S. Pat. No. 4,430,391 entitled "Fuel Cell Cathode" issued Feb. 7, 1984 to Ovshinsky, et al. (herein after "the '391 patent), which is incorporated herein by reference. Such a catalytic body is based on a disordered non-equilibrium material designed to have a high density of catalytically active sites, resistance to poisoning and long operating life. Modifier elements, such as La, Al, K, Cs, Na, Li, Ga, C, and O structurally modify the local chemical environments of the host matrix including one or more transition elements such as Mn, Co and Ni to form the catalytic materials of the oxygen electrode. These low over-voltage, catalytic materials increase operating efficiencies of the fuel cells in which they are employed. The non-noble catalysts are finely divided and disbursed throughout a porous carbon matte-like material. The material may or may not have a conductive substrate as needed. If used the substrate can be as described herein above.

The oxygen electrodes of this invention may also utilize redox couples, particularly metal/oxides couples selected from the group of metals consisting of copper, silver, zinc, cobalt and cadmium. These types of redox couples and others, such as nickel hydroxide/nickel oxyhydroxide or cobalt hydroxide/cobalt oxyhydroxide, are discussed in detail in the commonly owned copending application Ser. No. 09/737,332, the disclosure of which is hereby incorporated by reference.

A preferred embodiment of the present invention relates to an oxygen electrode comprising, a cathode active material capable of reversibly storing energy through the mechanism of a redox couple. The active material has a first surface region situated to be exposed to molecular oxygen and a first surface region including a catalytically acting component promoting the absorption of molecular oxygen through the first surface region and conversion thereof into atomic oxygen. The active material also includes a redox couple material (e.g. a metal, an oxide or other suitable species) which is thereafter chemically charged by reaction with the atomic oxygen. The oxygen electrode also includes a second surface region situated to be exposed to the fuel cell electrolyte. The second surface region includes a catalytically acting component promoting the reactions between the redox active material and the electrolyte. The oxygen electrode may also include a hydrophobic component positioned between the first and second surface regions. Such an oxygen electrode will display favorable voltage potential over conventional prior art oxygen electrodes.

The oxygen electrodes of the present invention may utilize redox couples, particularly metal/oxides couples selected from the group of metals consisting of copper, silver, zinc, cobalt, cadmium and mixtures thereof. Another useful redox couple is the nickel hydroxide/nickel oxyhydroxide couple disclosed herein above.

The oxygen electrodes of the instant invention may also include a catalytic material, which promotes and speeds the dissociation of molecular oxygen into atomic oxygen (which reacts with the redox couple). A particularly useful catalyst is carbon. This carbon should be very porous and may be electrically conductive.

The oxygen electrode also needs a barrier means to isolate the electrolyte, or wet, side of the cathode from the gaseous, or dry, side of the cathode. A beneficial means of accomplishing this is by inclusion of a hydrophobic component comprising a polyhalogenated organic compound, particularly polytetrafluoroethylene (PTFE) within the electrode.

The oxygen electrodes may also include a current collector or current collecting system extending within the active material. The current collector may comprise an electrically conductive mesh, grid, foam or expanded metal. The choice of such collection systems may be made according to electrode manufacturing or production system needs.

Figure 9:
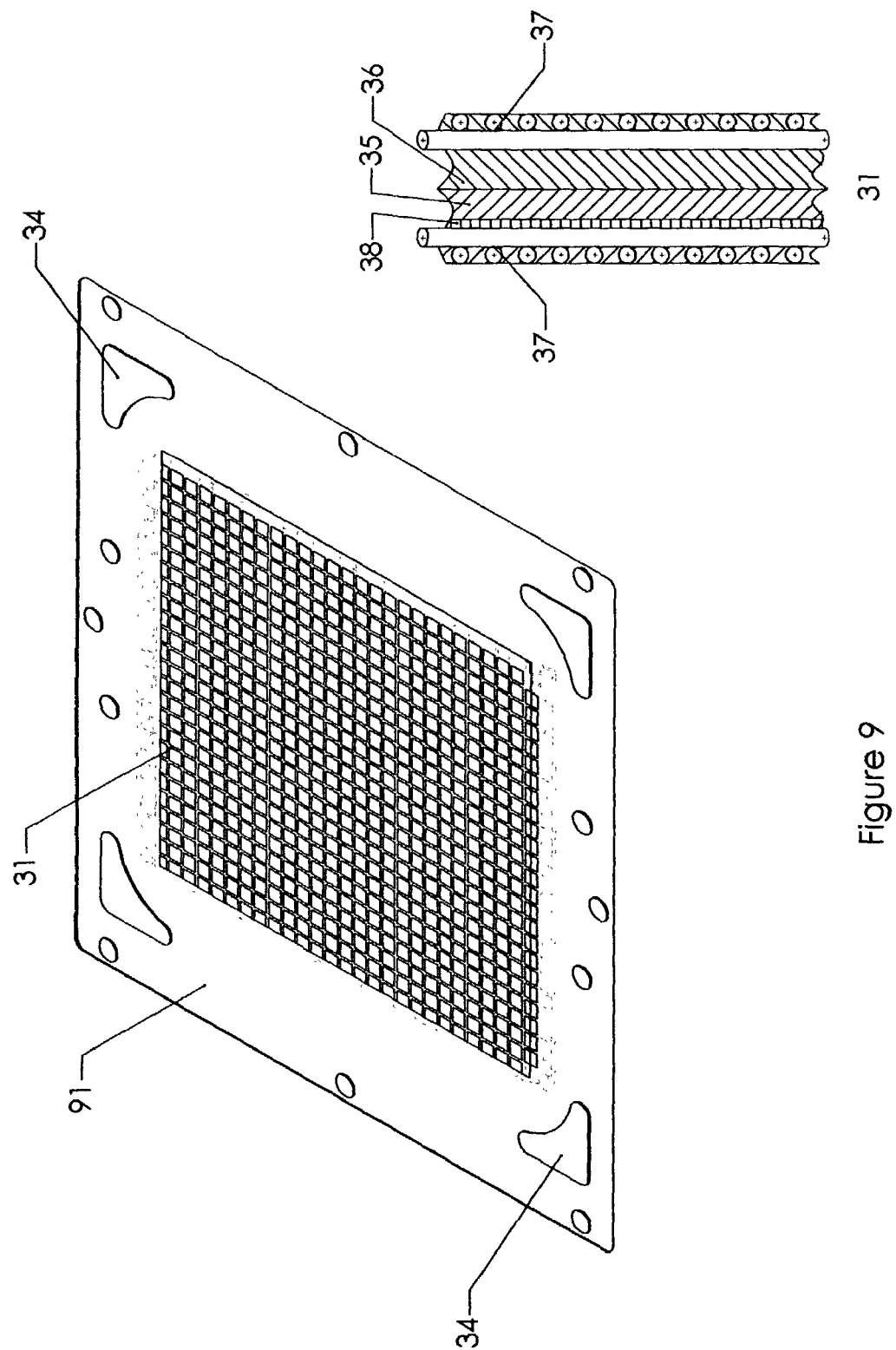
FIG. 9 illustrates a cross sectional view of the preferred embodiment of the cathode in accordance with the present invention.

The oxygen electrodes in the preferred embodiment of the present invention have a layered structure and are shown in FIG. 9. The layered structure promotes oxygen dissociation and absorption within the oxygen electrode 31. Each oxygen electrode 31 is composed of an A layer 35, a B layer 36, a current collector grid 37, and a polytetrafluoroethylene layer 38. The A layer 35 may be composed of carbon particles coated with polytetrafluoroethylene. The carbon particles may be carbon black known as VULCAN® XC-72 carbon (Trademark of Cabot Corp.), which is well known in the art. The A layer 35 may contain approximately 40–60 percent by weight polytetrafluoroethylene with the remainder consisting of carbon particles. Due to the higher hydrophobicity of the A layer 35 as compared to the B layer 36, in a preferred embodiment, an aqueous solution containing the active catalyst material penetrates only the B layer 36 thereby allowing deposition of the active catalyst material only in the pores of the B layer 36. Upon deposition of the active catalyst material within the B layer 36, the active catalyst material forms submicron to nano particles within the pores of the B layer 36. The oxygen electrode may be over-molded with rubber, ethylene propylene diene monomer (EPDM) or other elastic sealer 91.

The B layer 36 may be composed of the A layer 35 material and additional carbon particles, graphite and silver oxide. The B layer 36 may contain approximately 50 percent of the material of the A layer 35, 15 percent carbon, 15 percent graphite and 20 percent silver oxide. The carbon added to the B layer 36 is carbon black known as BLACK PEARLS® 2000 (Trademark of Cabot Corp.). The graphite is preferably TIMREX® SFG 44 graphite (Trademark of Timcal Group). The silver oxide may also contain a lithium-aluminum alloy, gallium, or other modifiers for improved performance. In a preferred embodiment, The B layer 36 may be composed of a carbon matrix composed of polytetrafluoroethylene coated carbon particles and a peroxide decomposer with an active catalyst material chemically impregnated within the carbon matrix. The carbon matrix is in intimate contact with a current collector grid that provides mechanical support to the carbon matrix. The current collector grid may be selected from the group consisting of mesh, grid, matte, expanded metal, foil, foam and plate.

In a preferred embodiment, the oxygen electrode includes a porous first layer having a built-in hydrophobic character, a porous second layer having a greater built-in hydrophobic character than the porous first layer, and two current collector grids as described in copending and commonly assigned U.S. application Ser. No. 10/219,788 filed on Aug. 15, 2002, which is hereby incorporated herein by reference. The porous first layer and the porous second layer are positioned adjacent to each other. The current collector grids are placed outside of the two layers forming a sandwich structure. The porous first layer of the oxygen electrode is composed of a carbon matrix. The carbon matrix of the first layer is composed of polytetrafluoroethylene coated carbon particles containing approximately 15–25% polytetrafluoroethylene by weight. The porous second layer of the oxygen electrode is also composed of a carbon matrix. The carbon matrix of the second layer contains polytetrafluoroethylene coated carbon particles containing approximately 40–60% polytetrafluoroethylene by weight.

In a preferred embodiment, the carbon matrix is impregnated with an active catalyst material as described in copending and commonly assigned U.S. application Ser. No. 10/219,788 filed on Aug. 15, 2002, which is hereby incorporated herein by reference. The active catalyst material may be deposited from $AgNO_3$, a $AgNO_3/Ga(NO)_3$ mixture, $AgNO_3/LiNO_3$ mixture, $Co(NO_3)_2$, a cobalt amine complex, $NI(NO_3)_2$, $Mn(NO_3)_2$, cyano complexes, organo metallic complexes, amino complexes, citrate/tartrate/lactate/oxalate complexes, transition metal complexes, and mixtures thereof.

The carbon matrix may contain 0–50 weight percent of a peroxide decomposer. The peroxide decomposer may be potassium doped manganese, $MnO_2$, MnO, cobalt oxide, nickel oxide, iron oxide, or a mixture thereof. The peroxide decomposer is added to the carbon matrix to help improve stability of the oxygen electrode. Stability of the oxygen electrode is adversely affected by hydrogen peroxide formed as a byproduct of the reduction of oxygen. The peroxide decomposer eliminates the hydrogen peroxide thereby maintaining stability within the oxygen electrode.

Reactive elements such as lithium may be added to the redox couple in the form of a non-reactive alloy such as a LiAl alloy. That is, lithium alone as an individual element is extremely reactive with oxygen and water vapor, therefore it is advisable to incorporate the element into the redox couple in the form of an alloy with aluminum, which is not reactive in this way. Other elements, which may be alloyed with the lithium, include boron and silicon. Specifically the LiAl alloy is a 50:50 At. % alloy. Ga may also be added to the silver oxide. Specific examples of silver oxides containing a Li—Al alloy or Ga are shown in Table 1. Such materials are disclosed in commonly owned copending application Ser. No. 09/797,332, filed Mar. 1, 2001, the disclosure of which is hereby incorporated herein by reference.

TABLE 1

| Sample Description | Analysis (ICP for 1–6; EDS rest) |
| --- | --- |
| 5% LiAl, 95% Ag from nitrates | Li:0.006%, Al:0.07%, Ag:99.924% |
| 1% LiAl, 99% Ag from alloy | Li:0.001, Ag 99.999% |
| 10% LiAl, 90% Ag from alloy | Li:0.82%, Al:5.16%, Ag:94.02 |
| 5% LiAl, 95% Ag from alloy | Li:0.034%, Al:0.29%, Ag:99.676% |
| LiAl, Ag | Ag:100% |
| 1% Ga, 99% Ag | Ag:100% |
| 5% Ga, 95% Ag | Ga:0.7%, Ag:99.3% |

The current collector grid 37 is placed on top of the B layer 36 which is placed on top of the A layer 35. The B layer 36 may be dispersed throughout the current collector grid 37. Examples of current collector grids include, but are not limited to, mesh, grid, matte, expanded metal, foil, foam and plate. The current collector grid 37 may be composed of a conductive material such as nickel. Other conductive materials may be substituted as required by design constraints. The other side of the A layer 35 is coated with a film of polytetrafluoroethylene 38. The nickel wire mesh 37 is in contact with the electrolyte solution and the polytetrafluoroethylene layer 38 is in contact with the oxygen stream.

Figure 10:
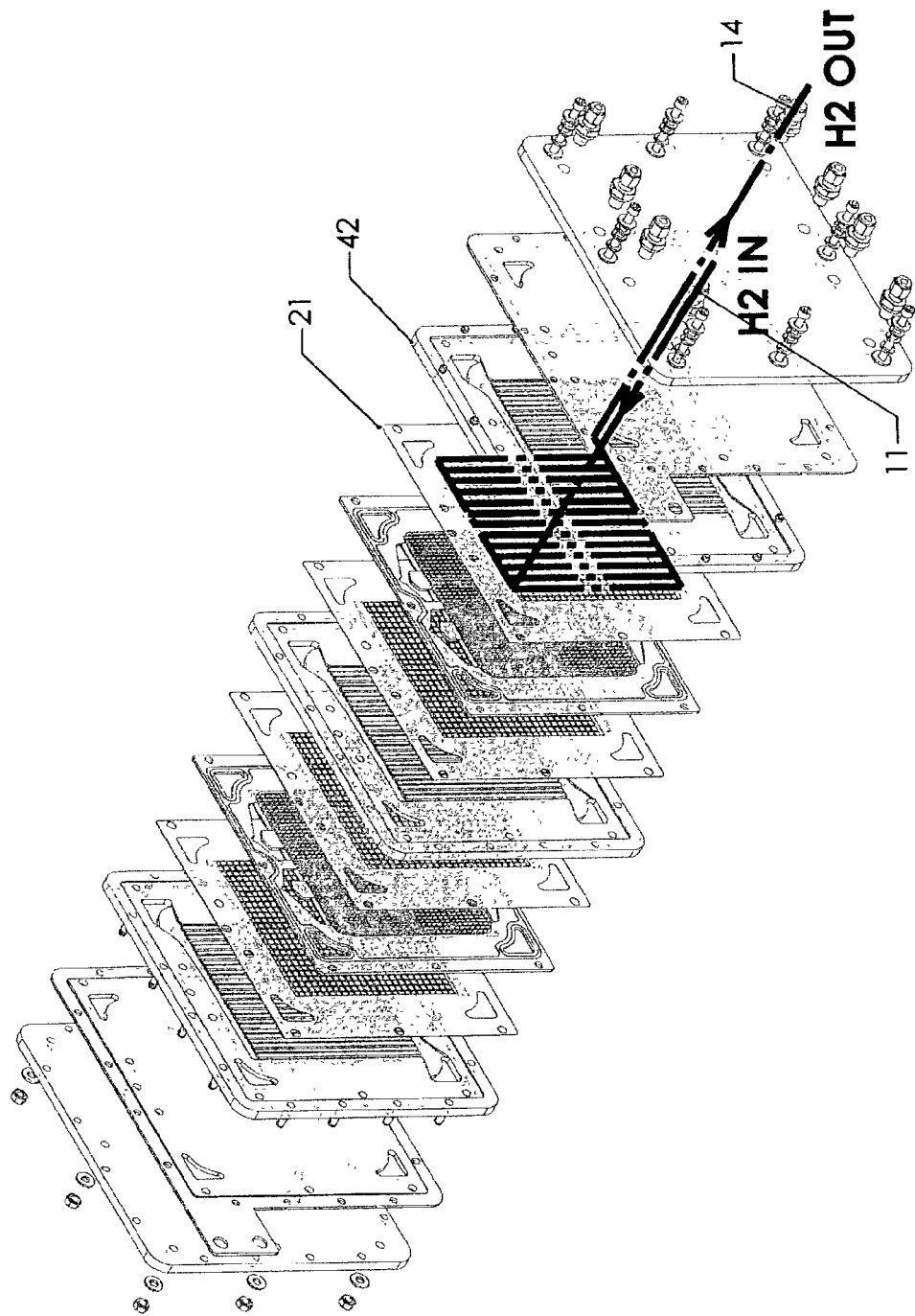
FIG. 10 is an exploded view of the fuel cell of the present invention, specifically shown is the flow of hydrogen through the fuel cell.

The flow of hydrogen through the fuel cell is shown in FIG. 10. In the hydrogen electrode section, hydrogen, preferably gaseous hydrogen, or hydrogen containing gaseous mixtures are supplied to the hydrogen electrodes 21 through the hydrogen inlet 11. Hydrogen is transported between the hydrogen electrode 21 and the hydrogen side of the bipolar plate 42 and is absorbed through the hydrogen contacting surface into the hydrogen electrode 21. The absorbed hydrogen is catalytically broken down by the anode active material 25 into atomic hydrogen, which is stored in the hydrogen storage material as a hydride. The stored hydrogen then finally reacts at the surface with hydroxyl ions to form water. It should be noted that the heat of hydride formation might help to warm the fuel cell to an optimal operating temperature. Any unreacted hydrogen and other contaminant gases or water vapor in the hydrogen supply are vented through the hydrogen outlet 14. The vented gases may be recycled if enough hydrogen is present to warrant recovery. Otherwise the hydrogen may be used to provide a source of thermal energy if needed for other components such as a hydride bed hydrogen storage tank.

Figure 11:
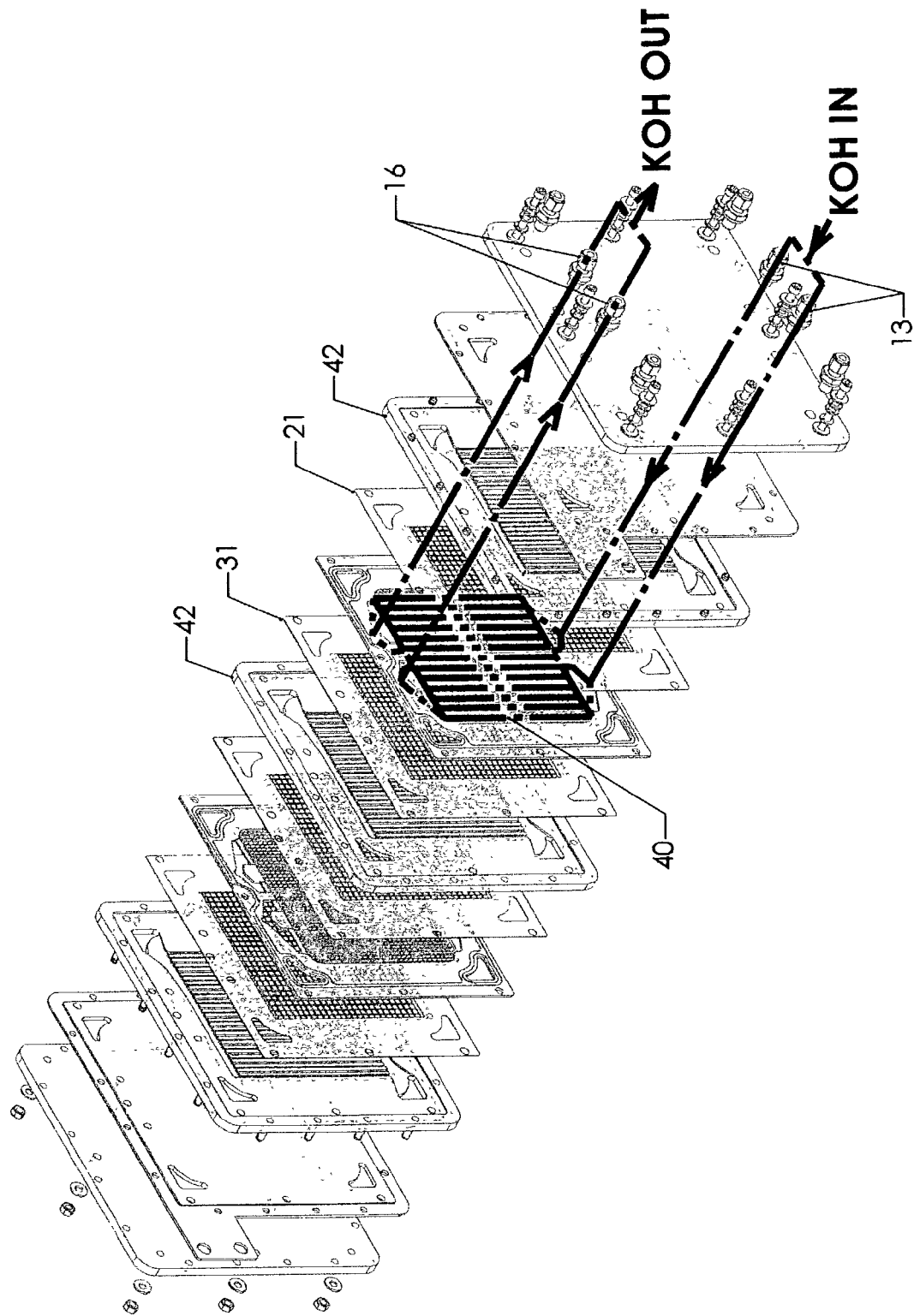
FIG. 11 is an exploded view of the fuel cell of the present invention, specifically shown is the flow of electrolyte solution through the fuel cell.

The flow of the electrolyte solution through the fuel cell is shown in FIG. 11. The electrolyte solution is an aqueous alkaline electrolyte in intimate contact with the electrolyte contacting surfaces of hydrogen electrodes 21 and the oxygen electrodes 31. The alkaline solution is well known in the art and is typically a potassium hydroxide solution. The electrolyte solution is supplied to the porous electrolyte chambers through electrolyte solution inlets 13. The electrolyte solution flows through the porous electrolyte chamber 40 and contacts the electrolyte contacting surfaces of the hydrogen electrodes and the oxygen electrodes. The electrolyte provides hydroxyl ions which react with hydrogen ions at the electrolyte contacting surface of the hydrogen electrode 21 and water molecules, which react with oxygen ions at the electrolyte contacting surface of the oxygen electrode 31. The electrolyte is circulated through the fuel cell via inlets 13 and outlets 16 (in alternative embodiments, the electrolyte may be deliberately immobilized as by jelling, etc.) The circulated electrolyte may be externally heated or cooled as necessary, and the concentration of the electrolyte can be adjusted (as via wicking, etc.) as needed to compensate for the water produced by the cell and any loses due to evaporation of water through the electrodes. Systems for conditioning the fuel cell electrolyte are well known in the art and need not be further described in detail herein.

Figure 12:
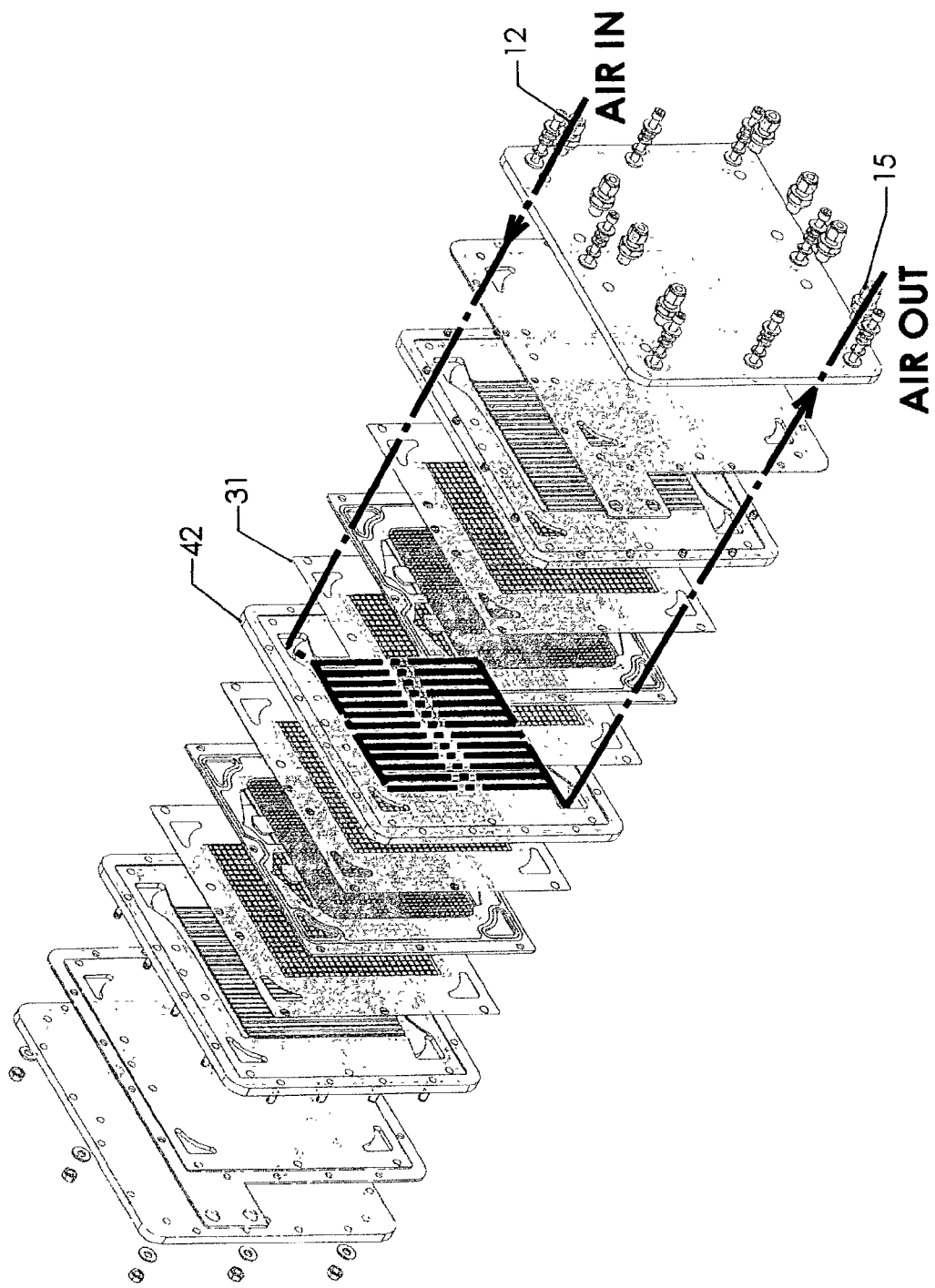
FIG. 12 is an exploded view of the fuel cell of the present invention, specifically shown is the flow of oxygen through the fuel cell.

The flow of oxygen through the fuel cell is shown in FIG. 12. In the oxygen electrode section, oxygen, air, or some other oxygen containing gaseous mixture is supplied to the oxygen electrodes 31 through oxygen inlet 12. Oxygen is transported between the oxygen electrode 31 and the oxygen side 44 of the bipolar plate 42. Oxygen is then adsorbed through the oxygen contacting surface into the oxygen electrode 31. The adsorbed oxygen is catalytically broken down by the cathode active material into ionic oxygen. The ionic oxygen then reacts at the electrolyte contacting surface with water molecules to form hydroxyl ions. Any unabsorbed oxygen and other gases in the feed (e.g. nitrogen, carbon dioxide, etc.) or water vapor in the oxygen supply are vented through the oxygen outlet 15.

The foregoing is provided for purposes of explaining and disclosing preferred embodiments of the present invention. Modifications and adaptations to the described embodiments, particularly involving changes to the shape of the fuel cell, the type of hydrogen storage alloy, the cathode active material, the shape and design of the electrodes within the fuel cell, and the shape and design of the electrode flow channels, will be apparent to those skilled in the art. These changes and others may be made without departing from the scope or spirit of the invention in the following claims.

We claim:

1. A fuel cell comprising:
    at least one hydrogen electrode in contact with a hydrogen stream, said hydrogen electrode comprising an anode active material having hydrogen storage capacity;
    at least one oxygen electrode in contact with an oxygen containing stream;
    at least one hydrogen electrolyte chamber in contact with said hydrogen electrode and at least one oxygen electrolyte chamber in contact with said oxygen electrode, each of said electrolyte chambers providing mechanical support within said fuel cell and providing an uninterrupted pathway for an electrolyte solution to contact said hydrogen electrode and said oxygen electrode; and
    at least one bipolar plate, said bipolar plate having a hydrogen side in contact with said hydrogen electrode and an oxygen side in contact with said oxygen electrode.

2. The fuel cell of claim 1, wherein said hydrogen electrode has a hydrogen contacting surface, an electrolyte solution contacting surface, and a bulk of said active anode material.

3. The fuel cell of claim 2, wherein said bulk of said anode active material is disposed between said hydrogen contacting surface and said electrolyte contacting surface.

4. The fuel cell of claim 2, wherein said hydrogen contacting surface is adapted to dissociate and adsorb gaseous hydrogen.

5. The fuel cell of claim 4, wherein said bulk of said anode active material is adapted to store said adsorbed hydrogen.

6. The fuel cell of claim 5, wherein said electrolyte contacting surface is adapted to react said stored hydrogen with an electrolyte solution.

7. The fuel cell of claim 1, wherein said bipolar plate has a plurality of channels depressed into said hydrogen side and said oxygen side.

8. The fuel cell of claim 7, wherein said channels extend vertically and horizontally across said hydrogen side and said oxygen side.

9. The fuel cell of claim 1, wherein said bipolar plate comprises a material selected from the group consisting of nickel and conductive plastic.

10. The fuel cell of claim 1, wherein each of said electrolyte chambers comprises a porous support structure disposed between a pair of membranes.

11. The fuel cell of claim 10, wherein said membrane prevents said hydrogen stream and said oxygen stream from penetrating into said electrolyte.

12. The fuel cell of claim 1, wherein said anode active material comprises a mixture of mischmetal nickel alloy, raney nickel, graphite, and polytetrafluoroethylene powder.

13. The fuel cell of claim 1, wherein said anode active material comprises:

39 weight percent mischmetal nickel alloy, 49 weight percent raney nickel, 4 weight percent graphite, and 8 weight percent polytetrafluoroethylene powder.

* * * * *